Dec. 30, 1930.　　A. M. ROSSMAN　　1,787,053
STATION CONSTRUCTION
Filed Dec. 31, 1927　　14 Sheets-Sheet 1
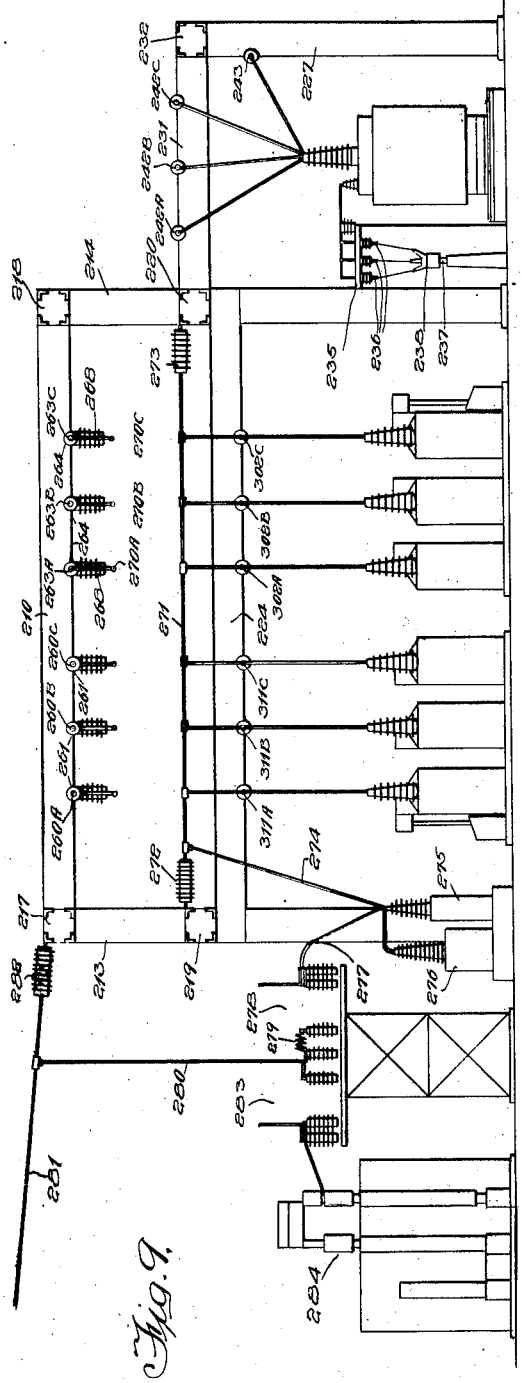
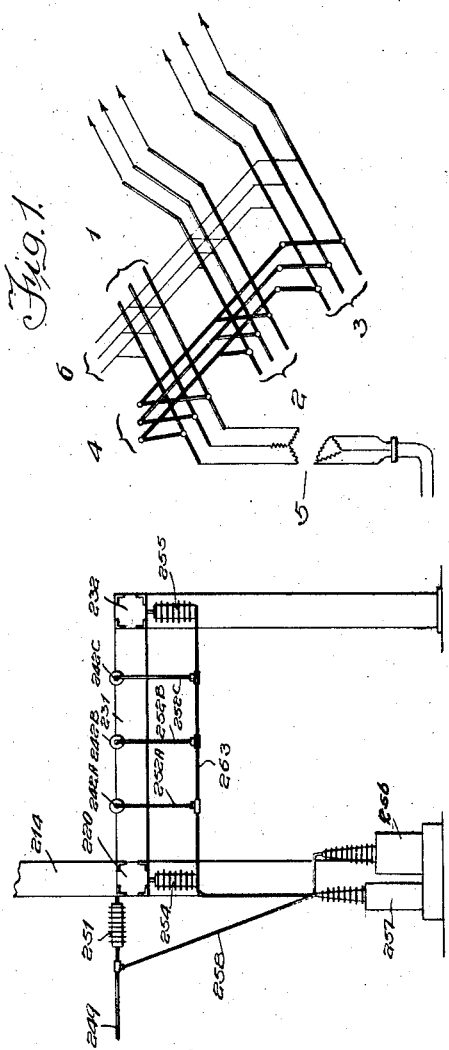
Witness:
William P. Kilroy
Inventor:
Allen M. Rossman

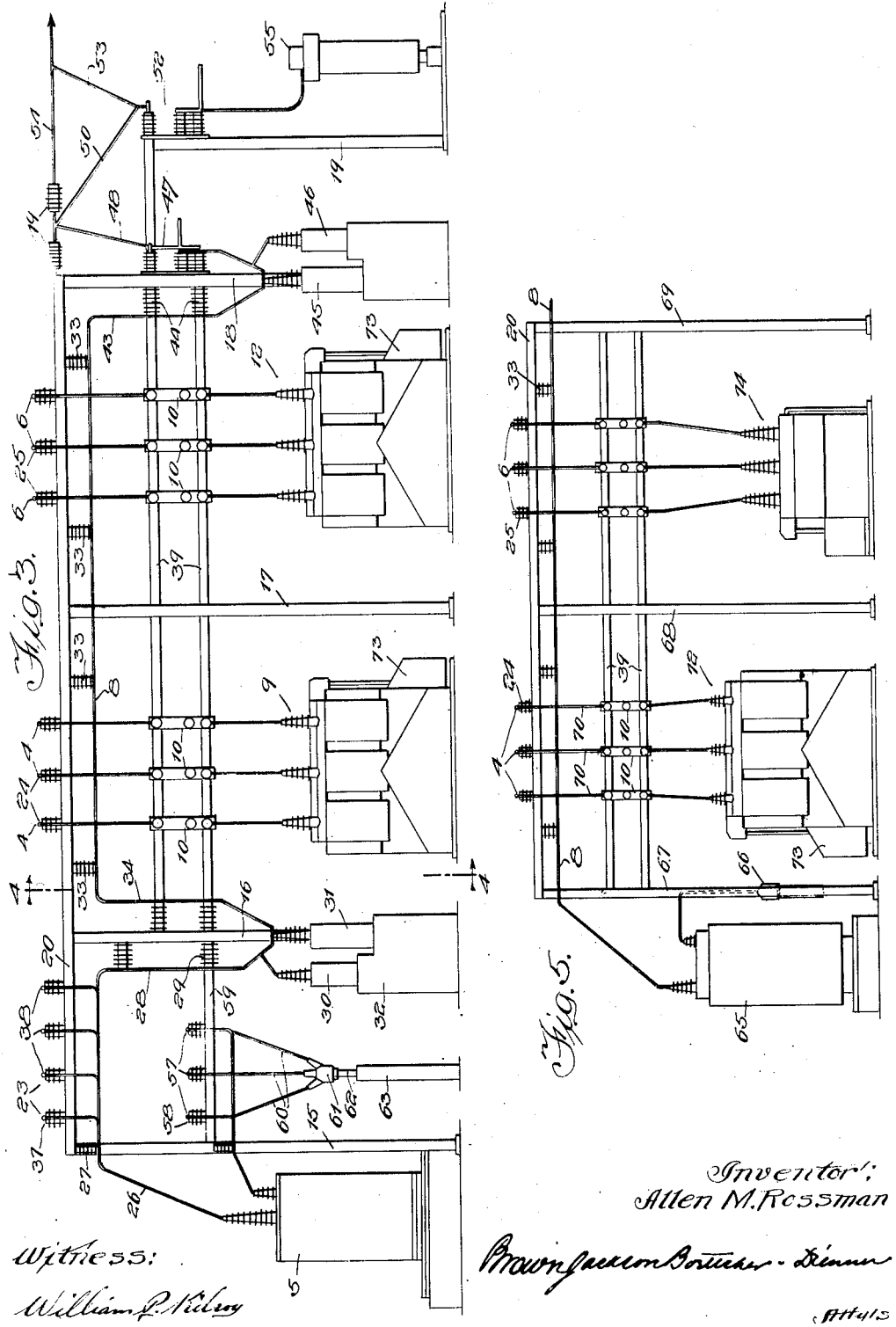

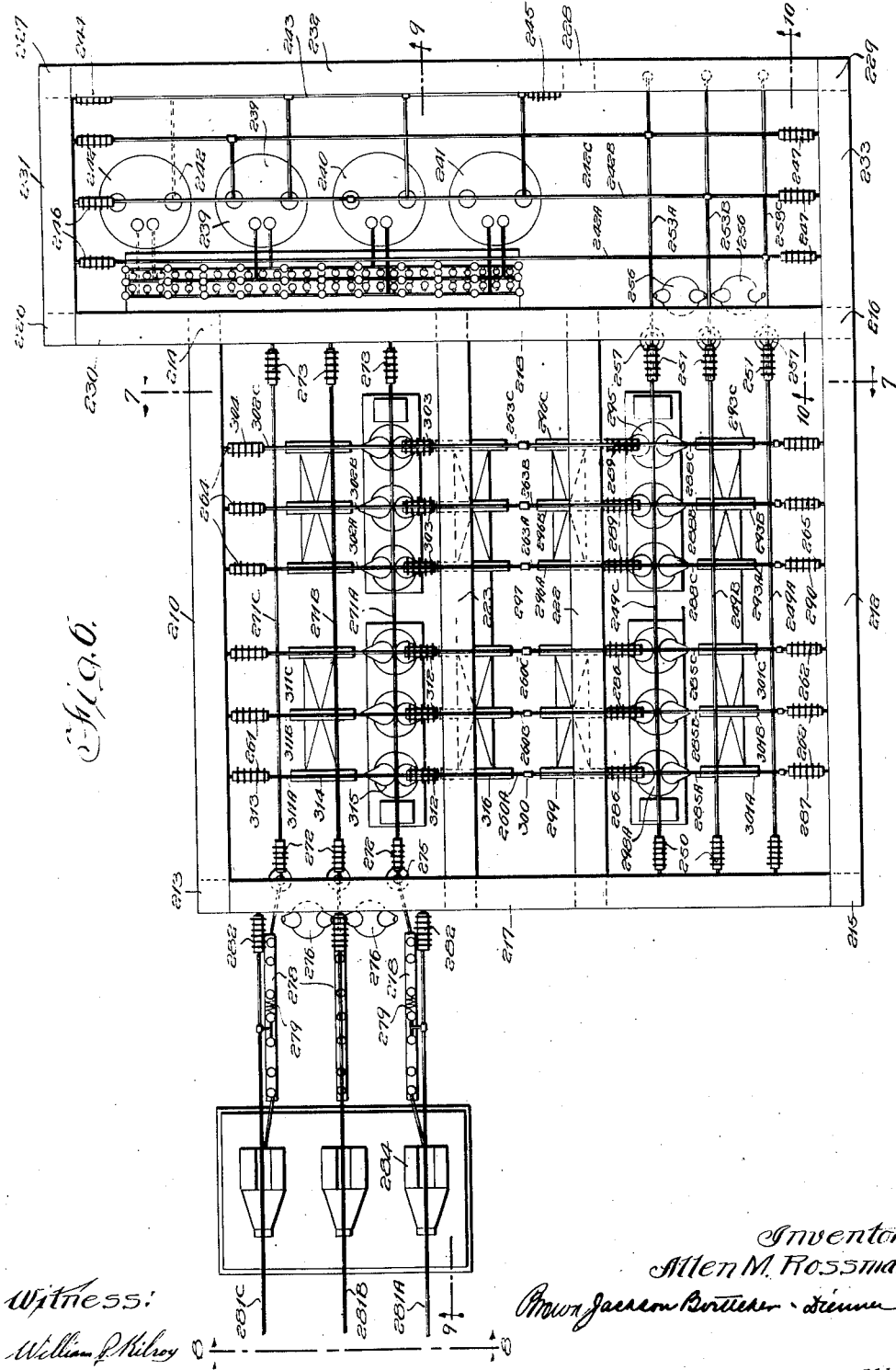

Dec. 30, 1930.    A. M. ROSSMAN    1,787,053
STATION CONSTRUCTION
Filed Dec. 31, 1927    14 Sheets-Sheet 5

Witness:
William P. Kilroy

Inventor:
Allen M. Rossman

Dec. 30, 1930.  A. M. ROSSMAN  1,787,053
STATION CONSTRUCTION
Filed Dec. 31, 1927  14 Sheets-Sheet 6

Witness:
William P. Kilroy

Inventor:
Allen M. Rossman

Dec. 30, 1930.  A. M. ROSSMAN  1,787,053
STATION CONSTRUCTION
Filed Dec. 31, 1927  14 Sheets-Sheet 8

Witness:
William P. Kilroy

Inventor:
Allen M. Rossman
By Brown, Jackson, Boettcher & Dienner
Attys

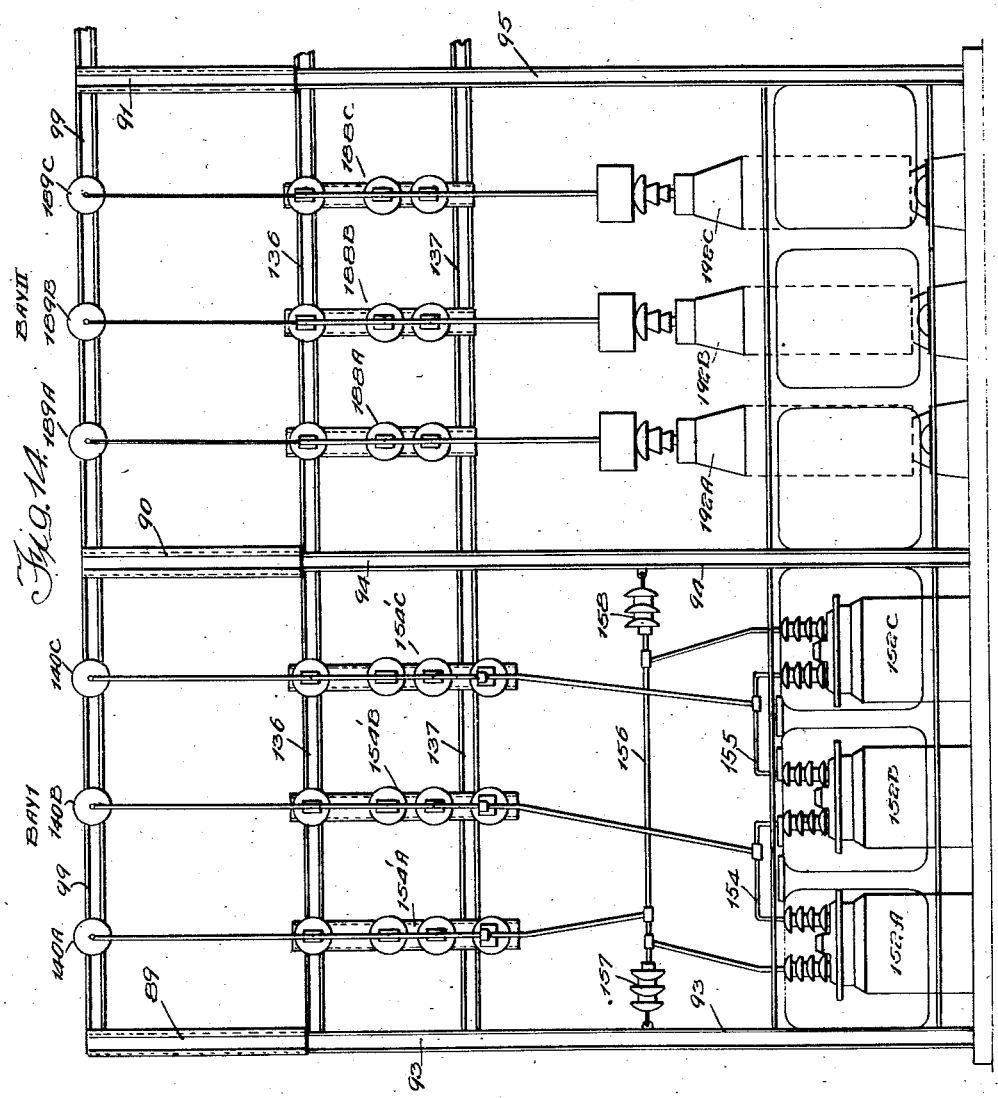

Dec. 30, 1930.  A. M. ROSSMAN  1,787,053
STATION CONSTRUCTION
Filed Dec. 31, 1927.  14 Sheets-Sheet 10
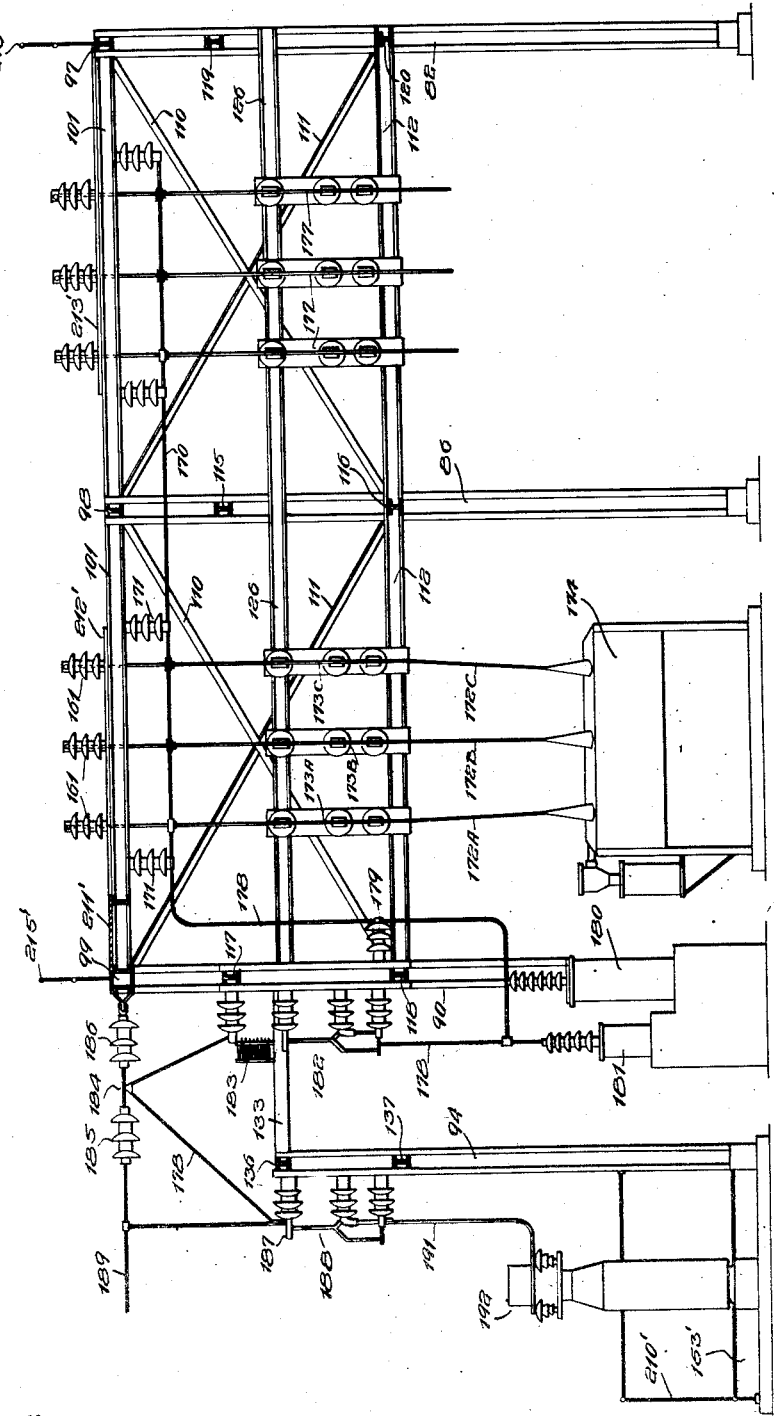

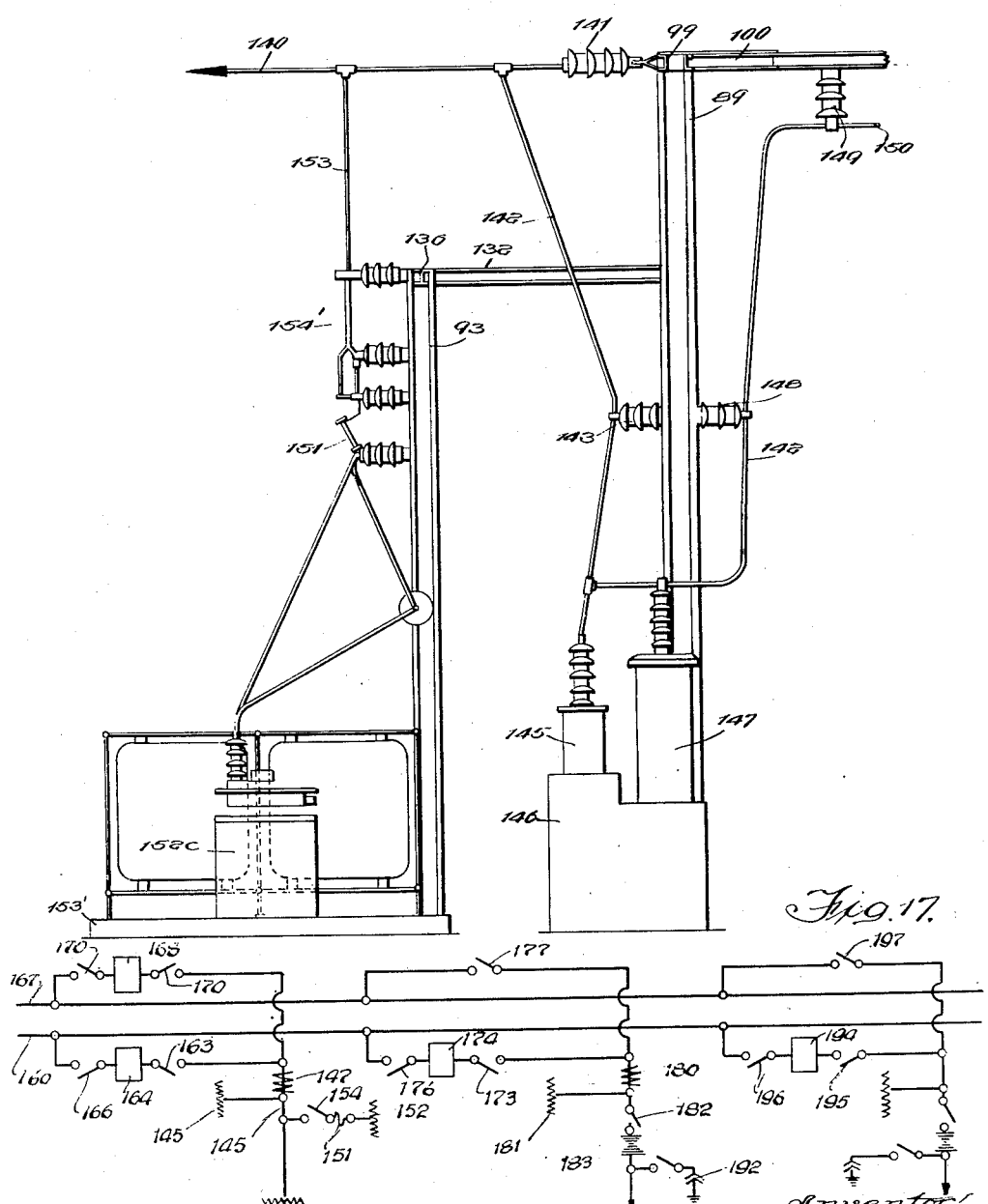

Dec. 30, 1930.  A. M. ROSSMAN  1,787,053
STATION CONSTRUCTION
Filed Dec. 31, 1927  14 Sheets-Sheet 12
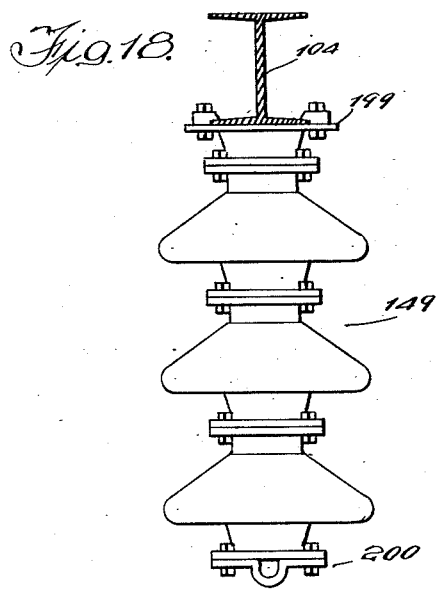
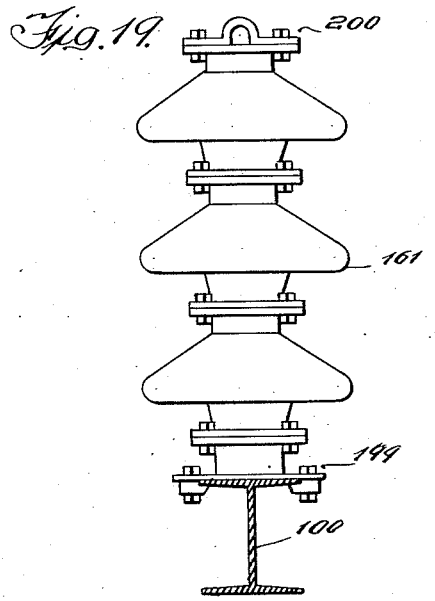
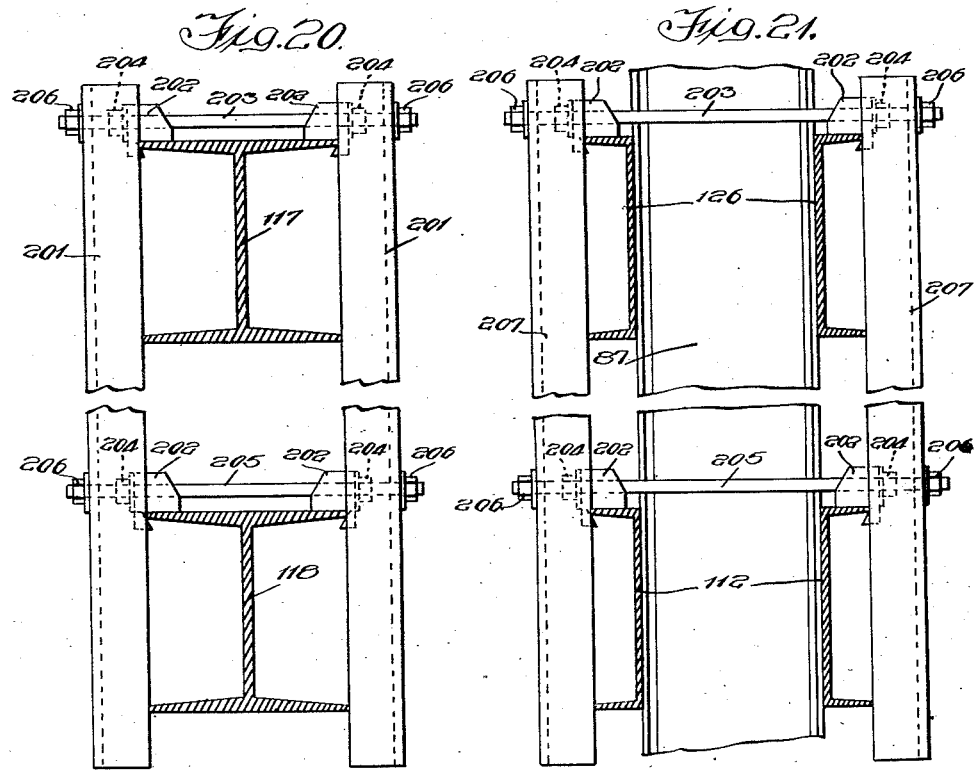
Witness:
William P. Kilroy
Inventor:
Allen M. Rossman
By Brown, Jackson, Boettcher, Dienner
Attys

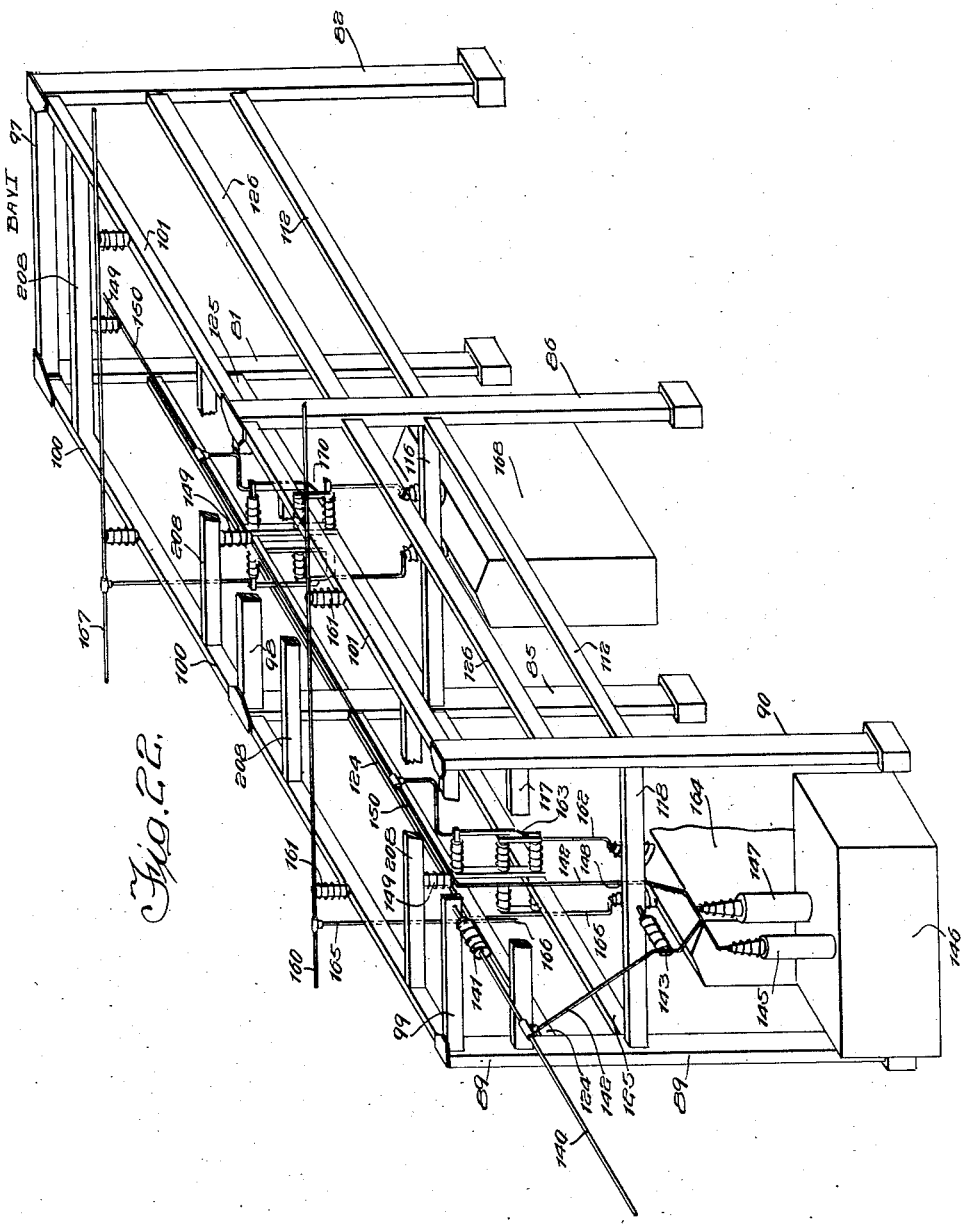

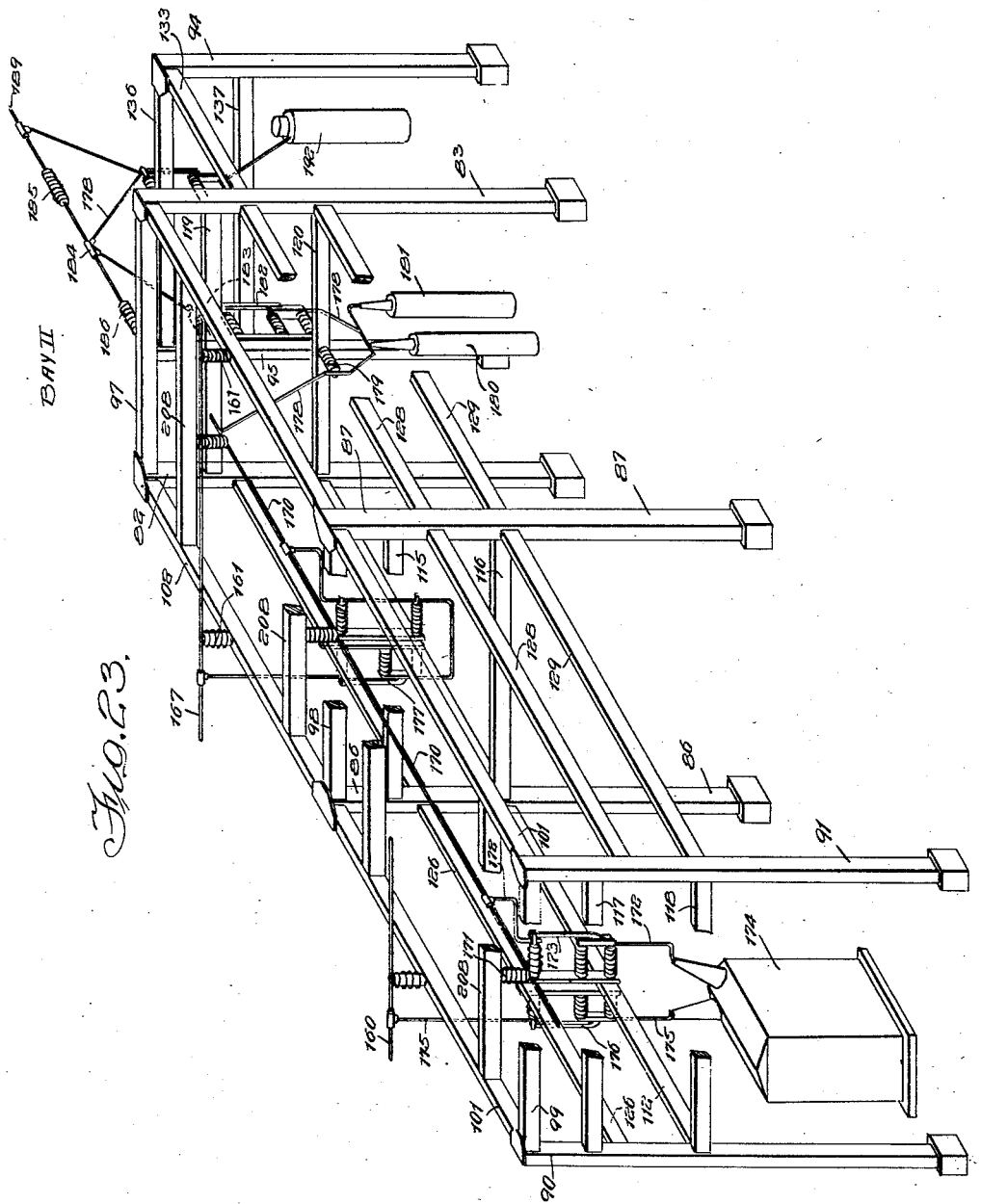

Patented Dec. 30, 1930

1,787,053

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

STATION CONSTRUCTION

Application filed December 31, 1927. Serial No. 243,908.

My invention relates to electric power distribution and more particularly to the construction of a station of the outdoor type, often termed a "switch yard".

The purpose of a switch yard is to provide the necessary interconnection of a power supply line with a number of distribution lines or feeders which distribute or transmit the current to the points of low voltage transformation and distribution.

According to present known practice, electric current is generated in a suitably located generating station and at a voltage lower than is desirable for transmission to remote distribution centers. The voltage is then stepped up for transmission to remote points and at such remote distribution points often termed "sub-stations", or at the premises of a large user, the current is stepped down to a suitable value for local distribution and use.

The theory back of this scheme is the quantity production of electricity under what may well be termed ideal factory conditions, and transportation to the consumer under conditions making for minimum expense of such service.

The switch yard or "switch house" when the apparatus is under cover, is the connecting and protective link between generation and transmission. The switch house or switch yard, which generally includes the transformers, has the duty of stepping up the voltage from the generating to the transmission voltage and providing the necessary interconnecting protective and measuring mechanism required for subdividing the power at the transmission voltage among the various feeders that convey it to the step down local distribution centers.

The switching and protective apparatus is on the high tension side because of the advisability of employing only one set of step up transformers in the interest of economy of space and investment and efficiency of apparatus.

The requirements or general functions of a switch yard include the following:—

(1) The switch yard must provide suitable interconnection and disconnection between the power supply (secondary of the transformer) and the outgoing lines which may vary in number.

(2) The arrangement of the switching mechanism and connections must make provision for interconnection through more than one channel so that the failure of a single piece of apparatus, such as an oil switch, cannot tie up the entire yard. It is desirable to provide more than one path of connection so that inspection and repair may conveniently be made.

(3) The copper, i. e., the conducting parts, must be suitably supported on a framework, preferably made of structural steel to provide the necessary mechanical support. The conductors are supported above the ground in a suitable overhead position by this framework in the interest of safety and economy. Proper clearance about live parts must be maintained.

(4) The copper must be insulated from the frame by insulators sufficiently strong mechanically and electrically.

(5) All parts including conductors and pieces of apparatus should be accessible and readily rendered safe for workmen and attendants to perform their necessary duties.

(6) Safety devices must be so embodied in the circuits as to meet the contingencies incidental to operation. Heretofore, the design of each yard has been considered as a special individual problem, much like the building of a residence, and when the yard is designed it is an integral design or device to which it is difficult to make any additions, or in which any change largely affects the entire layout. Such design does not lend itself readily to adoption for another yard unless the conditions are identical in all respects.

I have for some time realized the desirability of so disposing the frame, the conductors, insulators, and other apparatus, as to permit the normal functions to be embodied and at the same time provide a general solution, i. e., certain unit constructions which can be embodied as required in varying capacities.

I have proceeded upon the theory that it should be possible to make all switch yards of the same voltage alike, except in the number of lines served, and that this variation of lines may be taken care of by the addition of unit constructions of a standard character.

In carrying this idea into practice, I have found it possible to produce a standard type of structure which, with differences in dimensions only (because of voltage differences) may be employed for all voltages up to a point where the weight of some of the apparatus requires separate mounting.

At that point with a slight variation in the design to provide such separate mounting, the voltage may be increased indefinitely and the only changes in the design are again in the dimensions corresponding to voltage. It will be appreciated at once by those skilled in the art that this facilitates construction, shortens the time of construction and lowers costs.

My invention provides a structure which makes it possible to do this. I provide a switch yard construction having a symmetrical and balanced relation between the steel structure and the conductors and apparatus. This permits of even spacing and a better balance of stresses. Sections may be added or left off to increase or decrease the capacity of the yard desired. The mechanical and electrical stresses are distributed more evenly and with regard to the employment of a minimum of material.

The arrangement of the conductors of the lines and of the busses provides greater safety for workmen and is better adapted to normal operation.

The design permits the stocking of the steel frame elements and electrical elements so that construction is facilitated and cheapened. More uniform workmanship can be secured where stations of similar construction are repeatedly erected. Many of the operations or assemblies may be made in the factory or mill instead of by field assembly.

In the station of my invention there is a novel disposition of the conductors with respect to each other and to the frame and of the circuit breakers with respect to the frame and to the conductors.

In the yard of my invention, I provide a generally rectangular frame supported on suitable posts or columns. The frame contains at least three groups of conductors, namely, (1) The incoming power conductors from the transformer;

(2) The outgoing conductors which parallel the incoming conductors;

(3) Bus conductors transverse to the incoming and outgoing conductors and connectible to them. There may be several parallel sets of bus conductors, as for example, a main bus and a transfer bus or a plurality of each.

The frame is preferably made of box girder columns connected by beams or box girders, and it may be provided with additional frame members providing support for the interconnections and their incidental apparatus, such as fuses, disconnects, etc.

The incoming power conductors and the outgoing line conductors are preferably disposed in the same plane below the plane of the bus conductors. It is therefore possible for a workman to make repairs or adjustment on the line conductors without being compelled to pass up through the live bus conductors or to have such live conductors between him and the ground.

The circuit breakers for making or breaking the connection between said various conductors are disposed in rows parallel to the power and the line conductors. They have their terminals disposed in planes in common with the bus conductors to which they are connected. This provides a symmetrical arrangement adapted to extension of the capacity of the station and to a better utilization of the space occupied.

The lines may be taken off in either of two directions, or both, as convenience may dictate.

Now in order to acquaint those skilled in the art with the manner of constructing and operating a device embodying my invention, I shall describe in connection with the accompanying drawings, a specific embodiment of the same.

In the drawings:—

Fig. 1 is a simplified line diagram illustrating the theory upon which my invention proceeds;

Fig. 3 is a side elevational view of a yard embodying my invention;

Fig. 5 illustrates a side elevational view of a yard for lower voltage than that shown in Figs. 3 and 4;

Fig. 6 is a plan view of a diagrammatic layout of a yard embodying my invention, the proportions being shown as for a voltage of 132 k. v.;

Fig. 9 is a view partly in side elevation and partly in section as indicated on the line 9—9 of Fig. 6;

Fig. 10 is a fragmentary sectional view taken on the line 10—10 of Fig. 6;

Fig. 14 is a longitudinal elevation as viewed on the line 14—14 of Fig. 11;

Fig. 15 is a longitudinal section taken on the line 15—15 of Fig. 11;

Fig. 16 is a longitudinal partial section taken on the line 16—16 of Fig. 11;

Fig. 17 is a line diagram of connections of the embodiment of Figs. 11 to 16, inclusive;

Fig. 18 is an inverted post-type insulator;

Fig. 19 is an upright post-type insulator;

Fig. 20 is a detail showing the typical method of mounting disconnect switch bases or insulator bases to H-beams.

Fig. 21 is a similar showing of a typical method of mounting disconnect switch bases or insulator bases to channel girders;

Fig. 22 is an isometric view of a transformer bay showing the mounting and connections of a single phase conductor in the framework; and Fig. 23 is a similar view of a feeder bay.

Figure 4:
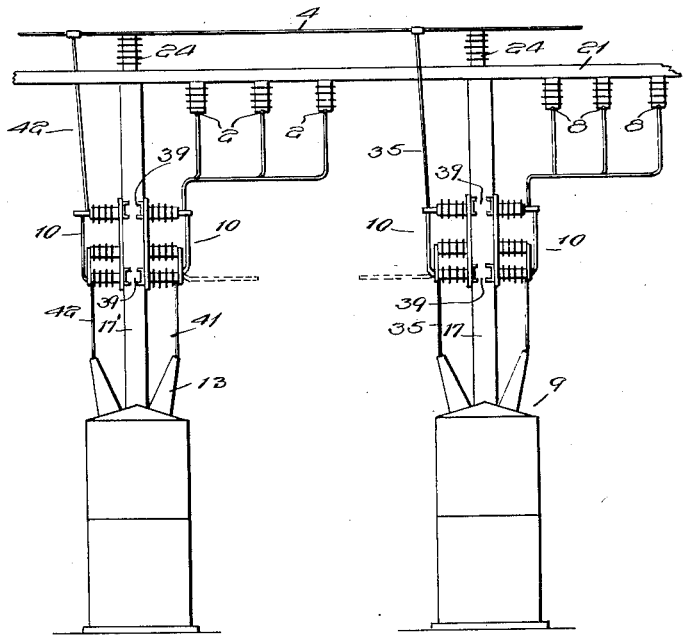
Fig. 4 is a section taken on the line 4—4 of Fig. 3.

Referring first to the diagram of Fig. 1, I have shown three groups of phase conductors in a common plane, namely, the groups 1, 2 and 3, and above them in a parallel plane the bus phase conductors 4 and 6. It is to be understood that the conductors herein shown and described are phase conductors of a three phase system.

The group 4 constitutes the main cross connecting conductors to unite the feeder group 1 to the line groups 2 and 3, the said line groups 2 and 3 leading off to remote points through suitable transmission lines or cables or the like. The power supply conductors 1 are connected to the secondary side of the transformer 5, the primary side of which is connected to a suitable generator or the like, either adjacent to the connections shown in Fig. 1 or remote therefrom.

I have conceived the possibility of utilizing the general scheme shown in Fig. 1 in building up a switch yard structure which, in addition to having certain inherent advantages of ease of construction, safety of operation, lends itself to universal use for substantially all sizes of stations.

The conductors in the group 1 are live so long as power is upon the system shown in Fig. 1, except, of course, as they may be completely disconnected from the transformer and, hence, the entire station is dead. This group of conductors 1 is therefore subject to the greatest proportion of continued usage. The group 4 is then next in importance of service, since the transmission of power from the power supply busses 1 occurs through the conductors 4 to reach the lines 2, 3 and so forth in the station.

It is on the lines that the greatest likelihood of incidental or accidental damage occurs and, hence, these lines, such as 2, 3 are subject to being taken out of service for inspection and repair to a greater extent than the bus conductors 4 or the power supply conductors 1.

By arranging the bus conductors 4 above the line conductors 2 and 3, it will be seen at once that the line conductors, 2, 3 may be easily reached for service inspection without the workmen or attendants being compelled to pass through or over a live net work.

It can be seen that by extending the bus conductors 4 substantially any number of lines may be connected. Likewise, if it is desired to take the bus conductors 4 out of service, another group of bus conductors 6 may be arranged in the same relation as the conductors 4 to act as a spare or auxiliary bus.

Now, in practice, the necessary protective switching and measuring apparatus must be installed in the connections in such a way as to permit connection of the lines through either bus 4 or 6 to the power supply conductors 1 and disconnection therefrom; also, that the power supply conductors 1 shall be connectible to and from the secondary of the transformer 5 in order to perform the usual functions of a station of this character.

For obvious reasons, it is desirable to support the heavy apparatus on bases or foundations on the ground whereas, the conductors are preferably supported overhead for the purpose of safety and to save space, and also to raise the live conductors to a point from which the span to overhead transmission towers or poles may easily be accomplished.

Figure 2:
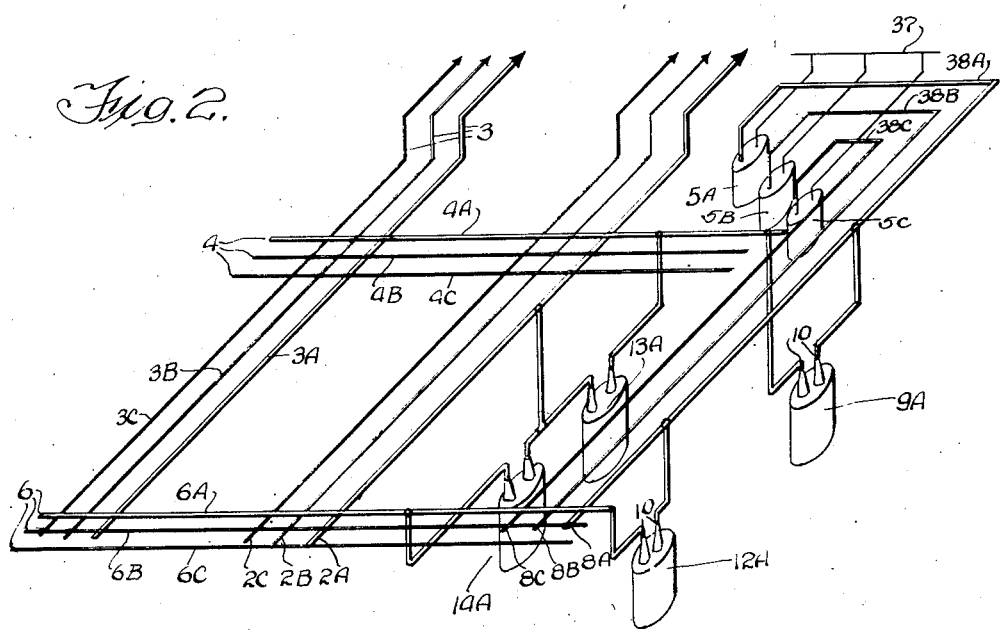
Fig. 2 is a similar diagram illustrating the theory of the disposition of the switches.

In the diagram of Fig. 2 I have shown substantially the same group of connections, but have, in addition, indicated the manner of making the connections between the busses, such as 4 or 6, and the line phase conductors, such as 2 or 3. I also show the manner of connecting the transformer to the main and auxiliary busses. In this case the three single phase transformers 5A, 5B and 5C are connected to the star bus conductor 37 and to the transformer connecting busses 38A, 38B and 38C in a star or Y net work. Transformer bus conductors 8 which are suitably connected to the transformer connecting busses 38 are preferably disposed on the same level as line conductors 2 and 3, that is, below the main and auxiliary busses, such as 4 and 6. Now, to connect the transformer busses 8 to the main bus 4, oil switches or circuit breakers, such as 9A, are mounted on suitable foundations or pedestals on the ground and connected through suitable disconnecting switches such as are indicated at 10, and suitable vertically extending conductors to connect, for example, bus conductor for phase A through the circuit breaker 9A to the main bus conductor 4A of the main bus 4.

In like manner the circuit breaker 12A, with the disconnect 10 in series therewith, is adapted to connect the bus phase conductor 8A with the auxiliary bus phase conductor 6A through suitable vertically extending connections.

For the connection of the bus phase conductors to the line phase conductors, for example, to connect the line phase conductor 2A to its corresponding main bus phase conductor 4A, I provide the oil circuit breaker 13A connected through suitable disconnect switches 10 and vertically disposed conductors, to make connection between said line phase conductor 2A and the corresponding main bus phase conductor 4A. In similar manner, the other phase conductors, such as 2B and 2C, may be connected to corresponding main bus phase conductors 4B, 4C through connections and switches (not shown, but which would correspond to the circuit breaker 13B and its corresponding disconnects).

In like manner, connection may be made from the auxiliary bus phase conductor 6A to the line phase conductor 2A through a circuit breaker 14A, suitable disconnects such as 10, and vertically extending connections. And, likewise, the other phase conductors of the line may be connected to the bus through like circuit breakers and disconnects.

Now it can be seen that with the conductors disposed as I have indicated in Fig. 2, the apparatus, such as the circuit breakers, begins to lend itself to an orderly treatment and compact and convenient disposition new in the art.

It will be appreciated that each line having its proper phase conductors may be connected to either the main or to the auxiliary bus conductors through suitable circuit breakers and disconnects which, for the sake of clearness, I have not shown, but which will be clear from the disposition of the circuit breakers 13A and 14A with their disconnects.

In the case of the lower voltages, the disconnects may be disposed in the vertical connections, whereas, for higher voltages when the disconnect switches become more cumbersome and heavy they are preferably mounted on foundations alongside of the circuit breakers.

Now, in order to explain the system of my invention more in detail, I refer to a more or less diagrammatic embodiment of Figs. 3 and 4 wherein I show substantially to scale the proportions for a 66 k. v. yard.

The structural elements comprise a series of columns, of which the side elevation shows the members 15, 16, 17, 18 and 19.

The columns such as 15, 16, 17 and 18 are connected together at their tops by longitudinal and transverse beams, the longitudinal frame members or beams 20 being shown in Figure 3 and the transverse beams or frame members 21 being shown in Figure 4. The beams 20 and 21 thus form an open rectangular frame, upon which are superimposed groups of insulators such as 23, 24 and 25 to support the transformer connection bus conductors 38 and 37 and the bus phase conductors such as 4 and 6.

The transformer connecting bus conductors 37 and 38 are connected on the high tension side of the transformer bank 5, the bus conductor 37 serving as above explained in connection with Fig. 2, to form the central or star connection.

The connection from the transformer bank 5 to the transformer connecting bus conductors 37 and 38 is made through conductors such as 26 which extend upward from the terminals of the transformer bank 5 and are supported by insulators such as 27 where the conductors take a horizontal run and then a vertical run to connect to the transformer connecting bus conductors 38 on the insulators 23.

Connections then run from the transformer connecting bus conductors 38 through the conductors 28 supported on suitable insulators, such as 29, supported on channel supports between the columns or posts 16, 16 down to a point where the potential transformer 30 and the current transformer 31 are mounted on a suitable base or pedestal 32. From thence the conductors extend through portions 34 to the transformer bus conductors, such as 8, these conductors being supported on suitable insulators, such as 33, depending from the overhead frame 20—21.

The bus phase conductors 8 are connected to the main bus conductors 4 through the circuit breakers 9 through the disconnects 10, as will be more apparent from Fig. 4. The opposite terminals of the circuit breakers 9 are connected, likewise, to disconnects 10 disposed in the conductors 35.

The disconnects 10 are mounted upon horizontally extending frame members 39—39 which extend, for example, between the posts 16, 17 and 18, providing thereby suitable supporting means for the disconnects. Thus, by disposing the circuit breakers 9 in line with the posts, such as 16, 17, and 18, and then running the beams, such as 39—39, between the same posts above the circuit breakers, a unitary construction of unusual simplicity and compactness is secured.

The auxiliary bus conductors 6—6 may, likewise, be connected to the transformer bus conductors 8—8 as by the circuit breakers 12 with the interposed disconnects 10 likewise mounted on the horizontally extending bars or frame members 39.

The individual lines, such for example as the line having the conductors 2—2, are connected to the main bus 4, as for example by the bank of circuit breakers 13, similarly disposed in line with a row of posts like the posts 16, 17 and 18, but directly back of the same, as viewed in Fig. 3, by a suitable distance, which distance is controlled by the voltage. Thus, the line conductors 2—2 are connected through the disconnects 10 and conductor 41 to the circuit breakers 13, then through a conductor such as 42 through the disconnects 10 to the main bus 4. Thus, it can be seen that the power comes in on the conductors 8, extends down through the disconnects 10, circuit breakers 9, up through conductors 35 to the main bus, and from the main bus passes down through conductors such as 42 to the circuit breakers and disconnects back up to the line conductors 2, which are suspended under the upper frame members 20—21. At the right hand end of the station the line conductors, such as 2—2, are connected by downwardly extending conductors 43 supported on insulators 44 to connect to the current transformer 45 and potential transformer 46 through disconnects, such as 47, and upward by conductor 48, terminating at its upper end between two suspension insulators 49 connected to the upper frame 20—21, then extending by conductor 50 to one terminal of disconnect switch 52, and then up by conductor 53 to the overhead wires 54, which are connected to the suspension insulators 49.

The opposite terminal of the disconnect switch 52 extends to ground through a suitable lightning arrester, such as 55.

Now the advantages of my invention will begin to be apparent. The number of lines that may be served by the station or yard shown in Figs. 3 and 4, is limited only by the extension of the frame work in a direction normal to the plane of the paper in Fig. 3. That is to say, assume that only the main bus 4 and the auxiliary bus 6 are to be employed as busses, to which lines may be connected, any number of bays to provide additional lines may be added, as, for example, by extending the frame and the columns to the left as viewed in Fig. 4. In Fig. 4 there is shown the bay for the transformer busses 8 at the right and a bay for the line 2 at the left. The number of lines to be served determines the number of additional bays like the one at the left in Fig. 4, and such bays are added merely by extending the frame and necessary conductors and apparatus in successive bays added at the side of Fig. 4.

Also, it will be apparent that the lines need not all extend out at the right, as viewed in Fig. 3, but they might extend out to the left as viewed in Fig. 3, since the transformer connecting busses 37 need only extend along far enough to include the three or four transformers which are stationed at the left of the yard as viewed in Fig. 3.

Attention is called to the fact that the space to be occupied by each unit construction depends upon the clearances demanded by the voltage.

Attention is called, for example, to Fig. 4 where the disconnects at the central part of the figure are shown in dotted lines. This indicates the clearance which prevails when the disconnects are opened. It is to be understood, of course, that the disconnects are opened only after the circuit breakers 9 or 13 have been operated to interrupt the flow of current.

In the yard shown in Figs. 3 and 4, a transformer bank is connected to the low tension busses 57 which are supported on insulators 58 on a frame 59 supported between the posts 15 and 16. The busses 57 are connected to the phase conductors 60 extending out of the pot head 61 at the terminal of the cable 62 which extends up through a suitable conduit 63 running from the generating station or other suitable point of power supply.

In low tension installations, the connections may be somewhat simplified, as shown, for example, in Fig. 5, which illustrates certain of the elements of a switch yard operating on a potential of 13.2 k. v. In this case, the transformer bank 65 is connected directly to the cable without the intermediary of low tension busses, the cable and pot head 66 in this case being in line with the row of columns 67. The transformer bus conductors 8 are supported below the frame members 20 on the insulators 33 and connected directly to the high tension side of the transformer 65. The main bus conductors 4 are mounted transversely across the top of the upper frame 20—21 and the transformer bus 8 and the line conductors, such as there may be, are mounted on insulators, such as 33, below the frame member 20. Connections are made, for example, between the transformer bus conductors 8 and the main bus conductors 4 by the vertical connecting conductors 70 extending through suitable disconnects 10 mounted on the longitudinal frame members 39 to the circuit breakers 72. These circuit breakers, in banks of three, are preferably operated by common operating mechanism, indicated by the reference numeral 73 on Fig. 5.

Preferably, all of the circuit breakers are thus operated in unison for each three phase run of conductors.

In a like manner, the connection between the transformer bus conductors 8 and the auxiliary bus conductors 6 is made in a similar manner through the circuit breakers 74. In this case the circuit breaker 72 is shown as of the size and proportions manufactured by one manufacturer, and the circuit breakers 74 that of the size and proportions manufactured by another manufacturer for the given voltage, namely, 13.2 k. v.

From this it will be seen that within the limits of apparatus now on the market either form of circuit breaker is equally applicable, since, in each case, overhead room is ample, considering the voltage, and the space devoted to the circuit breakers is ample to house the required apparatus.

It will be observed that between rows of columns, such as 15, 16, 17, 18 and 19, there are clear isles which may be traversed by workmen and attendants, these isles running longitudinally of the line circuits.

While I have shown open frame construction including the row of posts 15, 16, 17, 18 and 19, it is apparent that no fundamental change would be made by forming a solid or substantially solid wall, with the exception of the space devoted to the circuit breakers which would then lie in openings in the wall or below the solid portion of the wall.

Now, in order to illustrate a typical embodiment of my invention, I shall describe, in connection with Figs. 11 to 23, inclusive, the 33 k. v. switch yard at the Michigan City substation of the Northern Indiana Public Service Company at Gary, Indiana. In this yard there are illustrated two outgoing lines, a main and a transfer bus, or auxiliary bus, and a transformer bus. In this particular switch yard, the main transformer bank is not shown. It may be located either at the switch yard or at some point adjacent the station. Auxiliary transformers are shown, and they are fed by an underground cable which is switched into service in case of need.

The steel framework is made up of structural shapes which may be carried in stock for the construction of stations of this character, independent of the capacity or the number of lines served, since the structure is essentially made up of similar units for any capacity of stations on a given voltage.

As viewed in plan on Fig. 11, there are three longitudinal bays below the top frame member and two transverse bays above the top frame member. The longitudinal bays are devoted to the transformer busses and to the line, whereas, the upper transverse bays are devoted to the main and transfer busses. The frame comprises a series of vertical columns, which I have numbered from 81 to 92, respectively, for the main part of the frame, and a series of shorter columns, 93 to 96, inclusive, for the shorter columns, at the bottom of Fig. 11.

The posts 81 to 84 are connected by transverse beams 97 lying in line with the tops of the posts 81 to 84. Likewise, the posts 85 to 88 are connected by similar transverse frame members 98. The series of posts 89 to 92 are connected by a heavier transverse frame member 99, which, in the present case, consists of two channel bars placed back to back, whereas, the transverse beams 97 and 98 consist only of single I-beams.

In like manner, the row of posts 81, 85 and 89 in the longitudinal direction are connected by I-beams 100. The row of posts 82, 86 and 90 are connected by I-beams 101. The row of posts 83, 87 and 91 are connected by I-beams 102. The row of posts 84, 88 and 92 are connected by I-beams 103. These longitudinal and transverse frame members, where they join the posts, are connected together and to the tops of the posts or columns by suitable gusset plates, as is well understood by those skilled in the art.

To support the longitudinal transformer and line conductors, a series of light longitudinal beams are connected between the beams 97, 98 and 99 in the three bays above referred to. The beams in bay I are numbered 104, and the beams in bay II are numbered 105, and the beams in bay III are numbered 106.

This frame, so far described, supports the line and bus conductors as will be explained more in detail later.

The posts are further connected for reenforcing purposes by bracing members.

Figure 11:
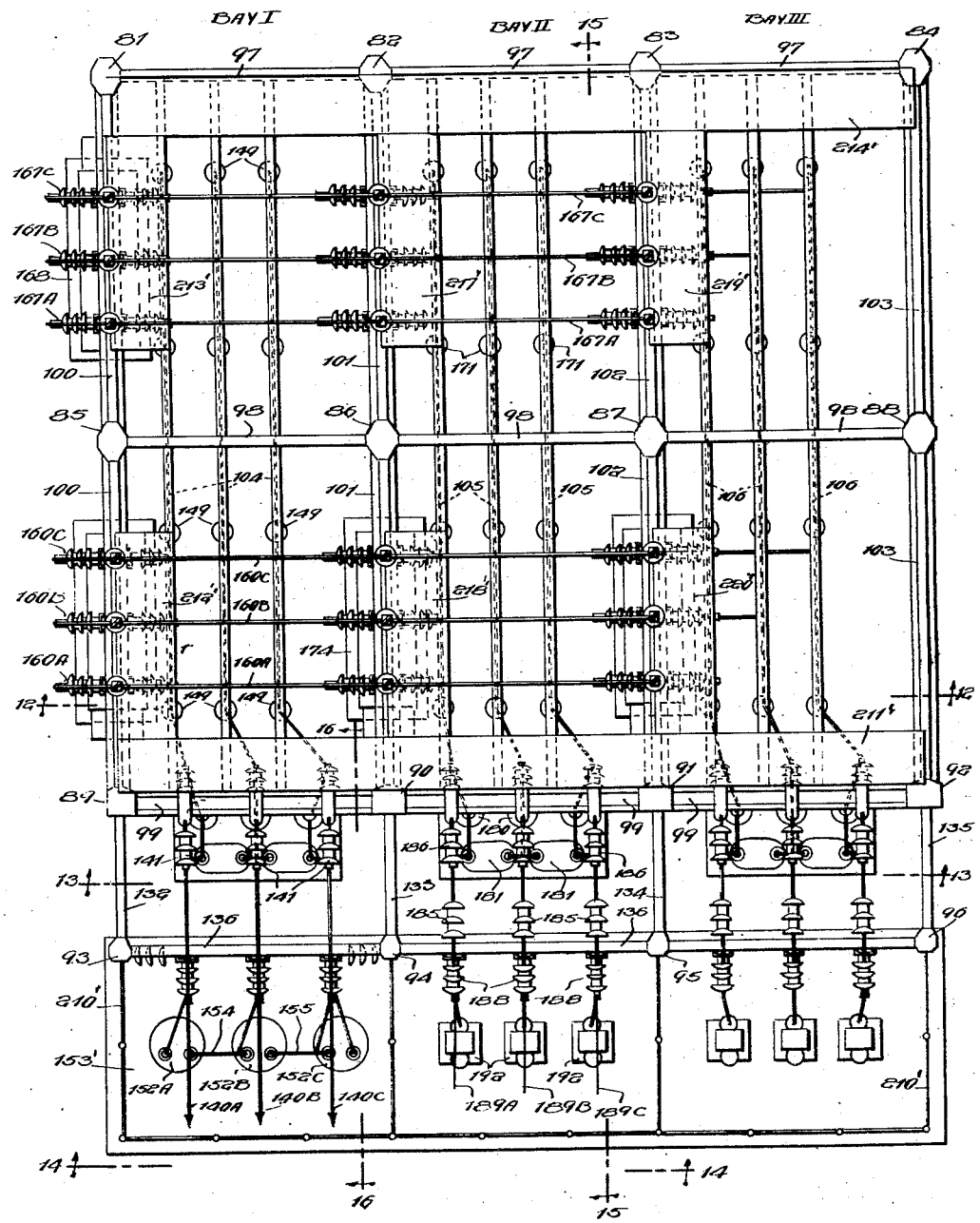
Fig. 11 is a plan view of a station comprising a 33 k. v. switch yard now installed in Michigan City, Indiana.

Referring to Fig. 11 it will be seen that the lines are led off longitudinally as from the bottom of Fig. 11. Hence, the pull of these conductors would tend to bend the posts and distort the frame. This, however, is prevented by suitable diagonal members. By reference to Fig. 15, it will be seen that posts 82, 86 and 90 are connected by diagonal thrust and tension members 110 and 111, top and bottom chord members being provided by the upper frame members comprising the I-beams 101 and the channel members 112 at the bottom.

Transverse diagonal bracing is provided by similar lattice beams comprising the diagonal members 113 and 114 with top and bottom chord members 115 and 116. In a similar manner there is such a lattice work beam extending between posts 89, 90, 91 and 92 comprising the top and bottom chord members 117 and 118 connected by diagonals 121 and 122 lying below the beam member 99. Also, in a similar manner there is a similar lattice beam comprising the upper and lower chord members 119 and 120, shown in section in Fig. 15, connected also by diagonals (not shown).

From the above it can be seen that the posts are thus connected into a solid frame which has suitable rectangular and diagonal bracing to withstand not only the pull of line conductors, but all normal forces which might be brought to bear upon the same.

Quite obviously, the line conductors might be led out longitudinally either way without departing from the invention.

There are, in addition to the above frame members, longitudinally extending channel bars or other frame members for supporting the disconnect switches, and these will now be referred to. There are pairs of channel beams 124—125 lying on opposite sides of the posts 81, 85 and 89 to provide support for the upper and lower ends of the bases of disconnect switches. Similarly connecting the posts 82, 86 and 90 there are similar pairs of oppositely disposed channel beams 126 and 112, as may be seen on Fig. 12. Likewise, between the posts 83, 87 and 91, pairs of channel bars 128 and 129 are provided, and between the posts 84, 88 and 92 similarly pairs of channel beams 129 and 130 are provided.

The short posts 93, 94, 95 and 96 are connected to the long posts 89, 90, 91 and 92 by the I-beams 132, 133, 134 and 135 as may be seen in Fig. 11. The posts 93, 94, 95 and 96 are connected at their upper ends by I-beams 136, the tops of said posts and the adjacent ends of the beams being connected by suitable gusset plates. A similar connecting beam 137 connects the posts 93, 94 and 95 below the beam 136, these beams being spaced apart suitably so as to provide support for the upper and lower ends of disconnecting switches to be referred to later.

Reference is now made to the conductors and apparatus connected thereto. The incoming transformer leads 140A, 140B and 140C, collectively referred to as 140, are brought in overhead at the lower left hand corner of Fig. 11, being anchored through strain insulators 141 to the cross beam member 99. Generally vertically extending conductors 142 are tapped onto the line 140, these conductors 142 being supported upon insulators 143. The insulators 143 are mounted upon channel iron bases 144 (see Fig. 13) connected to the beams 117 and 118.

A pair of potential transformers 145—145 are connected between phases A—B and B—C, these potential transformers being mounted upon a suitable foundation or base 146 between the posts 89 and 90.

The conductors 142 extend through the three current transformers 147 and then are trained upwardly, being supported upon insulators 148 to the group of depending insulators 149 which are rigidly connected to the longitudinal beams 104, as will be seen in Fig. 11. Here the conductors 142 merge into the bus conductors 150 which are, in reality, nothing more than an extension of said conductors 142.

The auxiliary transformers 152A, 152B and 152C, collectively designated as 152, are mounted upon a suitable foundation 153' extending across the lower end of the yard, as illustrated in Fig. 11. These transformers are adapted to have their low tension sides fed from a suitable low tension cable led underground to the generating station for use in case the main transformers are taken out of commission. These three transformers are shown connected together in delta on the secondary side, and from the delta connection taps 153 extend upwardly from the upper terminals of the disconnect switches 154', thus to connect through the conductors 142 to the bus conductors 150.

To effect this delta connection, the transformers 152 are connected together by the short busses 154 and 155 supported on the terminals of the transformers and by the longer delta bus 156 supported on strain insulators 157 and 158 on the posts 93 and 94.

The main bus conductors 160A, 160B and 160C, collectively designated as 160, are mounted upon suitable posts or bottom supported insulator columns 161, as shown in Fig. 19. These bus conductors extend only from the left (Fig. 11) over to the insulators 161 mounted on the beam 102, as may be seen in Figs. 11 and 12.

To make the connection between transformer bus conductors 150 to the main bus conductors 160, taps, such as 162A, 162B and 162C, are led down from the bus conductors 150A, 150B and 150C, respectively, through the disconnects 163 to the oil switch circuit breakers 164, thence up through a conductor 165 containing the disconnect switches 166. By this means, the transformer bus conductors 150 may be connected or disconnected with respect to the main bus conductors 160. The oil switch circuit breakers 164 may be disconnected from the corresponding busses by the disconnects 163 and 166, which are preferably gang operated switches for opening the line of all three phases simultaneously, likewise for closing simultaneously. Likewise, the circuit breakers 164 are preferably operated in unison.

Figure 12:
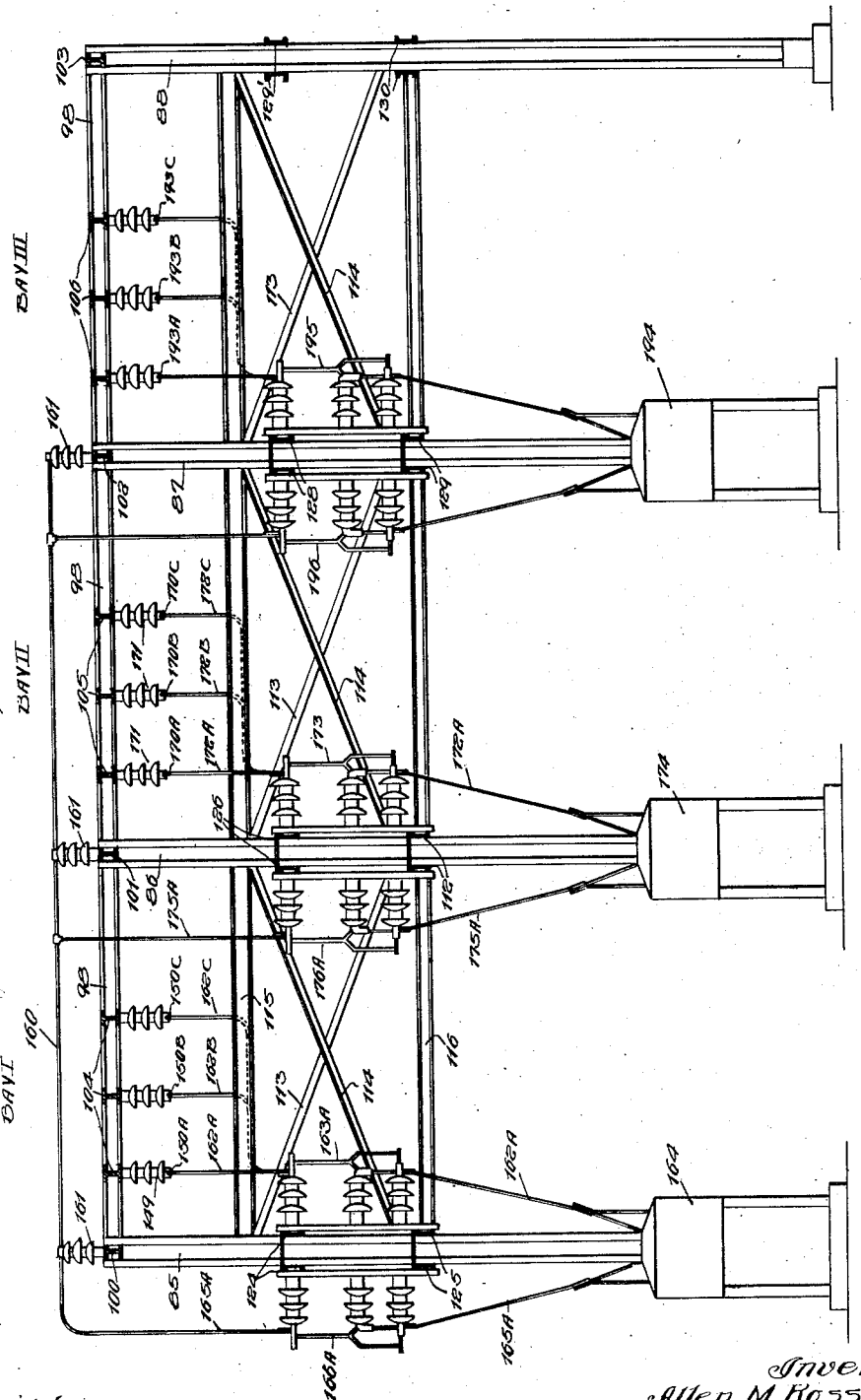
Fig. 12 is a sectional view of the same, taken on the line 12—12 of Fig. 11.
Figure 13:
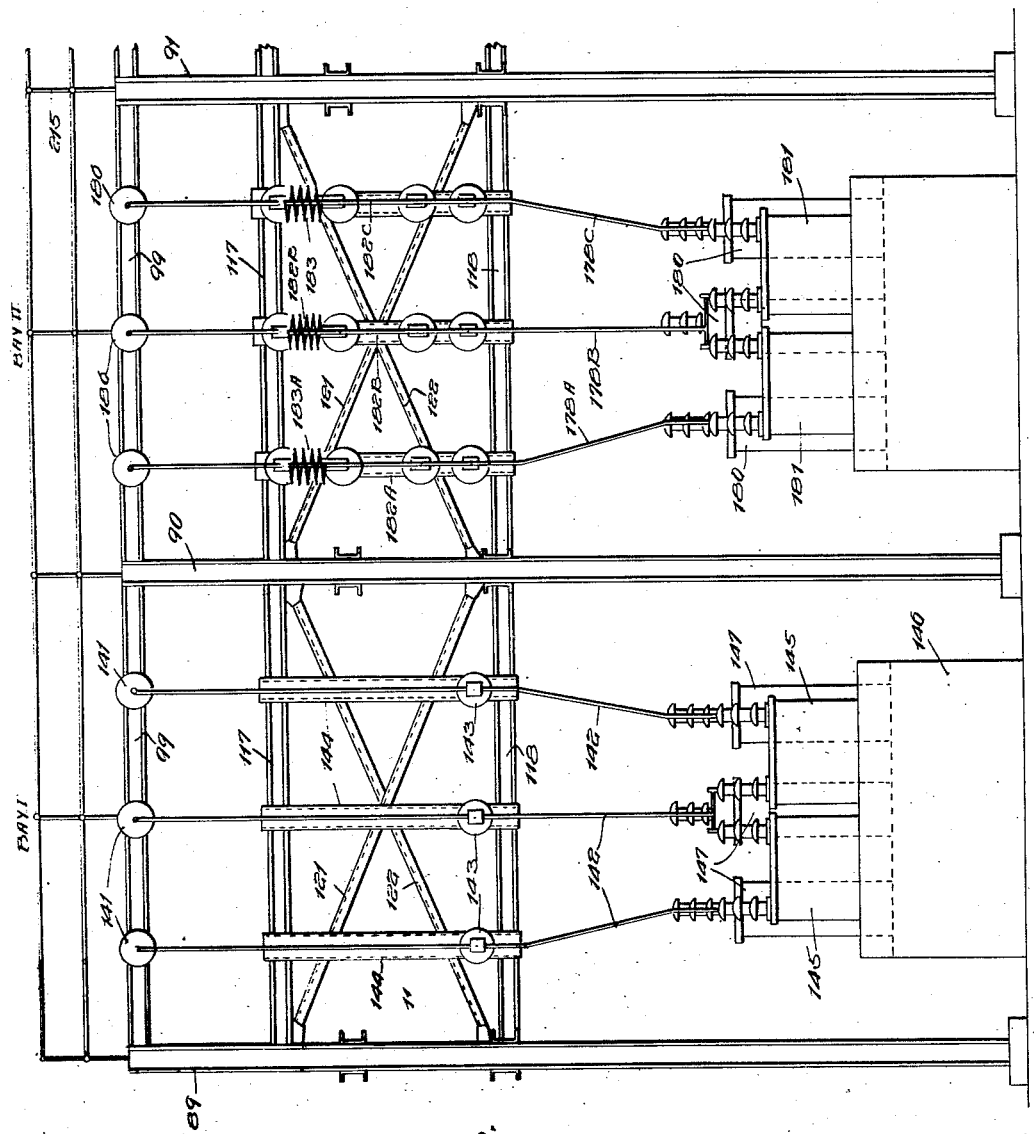
Fig. 13 is a partial elevational view taken on the line 13—13 of Fig. 11.

The connection between the transformer bus conductors 150 and the auxiliary or transfer bus conductors 167A, 167B and 167C, collectively indicated as 167, is made in the same manner through a suitable oil switch circuit breaker 168 and interposed disconnect which, in elevation, appears the same as shown in Fig. 12.

Referring now to bay 2 of Fig. 11 and Fig. 12, the line bus conductors 170A, 170B and 170C, collectively designated as 170, are mounted upon suitable insulators 171 supported below the longitudinal beams 105.

Taps 172A, 172B and 172C, collectively designated as 172, are let down from the line bus conductors 170 through suitable disconnects 173 to the oil switch circuit breakers 174, and from thence through conductors 175 and disconnects 176 connection is made with the main bus conductors 160.

No oil switch is provided for making connection between the line bus conductors 160 and the auxiliary bus 167, disconnect switches 177 only being provided. (See Figs. 15 and 17.) The line bus conductors 160 are connected by conductors 178 which are merely extensions of the same, extending downwardly and supported by insulators 179 to the current transformers 180 and the potential transformers 181, thence upwardly to disconnect switches 182, choke coils 183, then to an intermediate connector 184 between the suspension insulators 185 and 186. From thence the conductor 178 is looped downwardly to the free contact 187 of the disconnect switches 188, and then led upwardly and tapped onto the outgoing line conductor 189.

The movable member of the disconnecting switch in this case is connected by conductor 191 to the lightning arresters 192, which are mounted on the foundation 153.

The connections for the line bus conductors 193 in the bay III are identical with the connections previously recited in connection with the line bus conductors 170 in bay II. An oil switch circuit breaker 194 is provided to connect the main bus conductors 160 to the line conductors 193, suitable disconnects 195 and 196 being provided on the extremities of the circuit breakers 194. The connection between the line bus conductors 193 and the transfer or auxiliary bus 167 is made through the disconnect 197 only, (see Fig. 17) no oil circuit breaker being required.

Obviously, circuit breakers may be provided to make the connection between the transfer bus and the respective line circuits if so desired, since there is adequate provision for the mounting of the oil circuit breakers as well as suitable disconnect switches for the same. Since the purpose of the transfer bus is mainly to take care of repairs and emergency conditions, it is not generally deemed desirable to incur the additional expense of circuit breakers for this purpose.

The line in bay III is provided with current transformers, potential transformers, choke coils and lightning arresters and, if desired, fuses, just as in case of the line in bay II.

It will be apparent that if more lines are desired, all that is required is that the frame be extended to the right as viewed in Fig. 11 and that the transverse main and auxiliary bus conductors 160 and 167 be extended accordingly.

Fig. 17 shows a line drawing or diagram of connections with the reference numerals applied thereto to identify the apparatus and line connections. This diagram is a single line diagram.

In Fig. 18 I have shown a depending insulator in detail, such as the insulators 149 extending downwardly from the I-beam support 104, a suitable clamp 199 being provided for gripping the one end of the insulating column to the lower flange of the I-beam and the opposite end of the insulator column having a suitable clamp 200 for supporting the bus conductor.

In Fig. 19 I have shown the manner in which the insulating column, such as 161, is supported on the I-beam 100, the clamp 199 in this case embracing the upper edges of the I-beam flange and the opposite end of the insulating column having the conductor clamp 200.

In Fig. 20 I have illustrated the manner of mounting channel beam bases 201 such as are employed for the disconnect 173 seen in Fig. 15 on the I-beams 126 and 112, also shown in said Fig. 15. Clamping blocks such as 202 are hooked over the opposite edges of the flanges of the I-beam and drawn tight by means of a bolt 203, by threading nuts 204 upon the threaded ends of the same. Then the channel beam, such as 201—201, having registering holes therethrough, is laid against the edges of the I-beam flanges, the ends of the bolts projecting through the channel beam 201—201 and the channel beam being then held in position by nuts 206 threaded upon the ends of the bolts 203 and 205. The hollow side of the channel beam 201—201 encloses the blocks 202, thus providing a mounting permitting the disconnects or other apparatus having the channel bases 201—201 to be mounted independently, and yet when held in place imposing substantially no stresses upon the blocks 202.

The same form of mounting may be applied where the channel bases 201—201 are to be clamped to channel bars, as, for example, the channel bars 126 and 112 as seen in side elevation in Fig. 15 and in end elevation in Fig. 12. In this case the channel beams 126 and 112 are secured on opposite sides of the post 87. The blocks 202—202 are held upon the edges of the flanges of the channel bars 126 and 112 by means of the bolts 203 and 205, held in place by the nuts 204. Then the bases 207—207 may be applied and held in place by the nuts 206—206 threaded onto the ends of the bolts 203 and 205.

In Fig. 22 I have shown, in isometric view, bay I, which is the transformer bay, and have applied thereto the reference characters for identification purposes. It will be understood that this is diagrammatic and shows the location of a single conductor only, but that is typical of the conductors for all three phases. In Fig. 22 the same essential frame elements, conductors and apparatus are shown in the same essential relation. Instead of having the insulators 149 which support the bus conductors mounted on longitudinal beams, such as 104, these insulators are shown as mounted on transverse beams, such as 208. The diagonal bracing is not shown, but it will readily be seen that diagonal bracing may be employed in the row of columns 90, 86 and 82 in the plane of the longitudinal beams 101, 126 and 112. Likewise, it can be seen that diagonal bracing may be employed between the posts 89 and 90 in the plane of the bars 99, 117 and 118. Similarly, diagonal bracing may be employed between the posts 89, 85 and 81 in the plane of the longitudinal beams 100, 124 and 125. This diagonal bracing is possible, since in each case the incoming conductors pass under the bars 118 to connect to the bus conductor 150 and that the connection from the transformer bus conductor 150 to the main bus conductor 160 or the transfer bus conductor 167 is made by a connection which extends down and under the bars or beams 125. Hence, if the upper part of these posts, above referred to, were connected by solid walls, no interference with the connections or the apparatus would be occasioned, since in no case are the conductors passed through the grounded frame, but always around the same.

It will be understood that for an adjacent bay the bars 126 and 112 will support the disconnect switches in the same relative position as the disconnect switches 163 and 166 for the oil circuit breaker 164.

Referring to Fig. 23, I have shown a feeder bay, namely, bay II, with, however, the line 189 led off from the opposite end from what it is shown in Fig. 11. This is done to show the applicability of the fundamentally new structure to various situations.

It will be observed that the framework shown in Fig. 23, with the exception of a short section which has been omitted in Fig. 22, is precisely the same as that shown in Fig. 22. In other words, each bay in the framework is identical with other bays and, hence, for a given voltage and given spacings, the framework may be carried in stock and a yard erected on very short notice. The structural members may all be cut and punched to the required length and spacing, regardless of the ultimate size of the station or the number of lines served. This is something which has never been done in the construction of yards of this character.

The finished yard has certain appurtenances and refinements which I do not believe it is essential to mention, but for the sake of clearness and explanation of the features shown, I shall briefly refer to here.

The transformers and lightning arresters are mounted on a common base 153' and, since they are on the ground level, they are carefully guarded by a pipe railing 210', which is best shown in Figs. 11 and 15.

The vertical posts or columns are preferably made of box girders, although this is optional. The disconnects are all preferably gang operated.

On top of the upper frame, sheet metal platforms such as shown at 211', 212', 213' and 214' may be mounted on the outer frame member, such as 99, 100 and 97, and the hand railing 215' and 216', as shown in Fig. 15, be provided for the convenience of workmen and also to protect some of the apparatus from precipitation. In like manner supplementary platforms may be mounted at 217' and 218' in bay II and at 219' and 220' in bay III. There is no reason why these platforms could not be extended if desired, except that they must remain clear of the downwardly extending leads. By providing these specific platforms, the ease of inspection and making connection is promoted.

While the above station is designed for 33 k. v., the same design may be provided for higher or lower voltages.

However, when the voltage is increased to the order of 132 k. v., the clearances required are of course larger, with the result that the disconnect switches, due to the length of break required and the weight of the operating mechanism involved, could be more economically mounted on pedestals or foundations than upon the longitudinal beams running between columns.

In Figs. 6 to 10, inclusive, I have illustrated, more or less diagrammatically, the manner in which my invention may be embodied in a higher voltage station, employing, for example, 132 k. v.

The framework in this construction is preferably made up of box girder columns and box girder beams. The upper rectangular frame of box girders comprises the longitudinal beams 210 and 212 connected at their ends to the four corner posts or columns 213, 214, 215 and 216. Transverse beams 217 and 218, lying in the same plane as the beams 210 and 212, are also connected to said columns so as to form an open rectangular frame. Below the girders or beams 217 and 218 I provide beams 219 and 220. Below the beams 212 and 210 and a short distance below the beam 219, I mount the four longitudinal beams 221, 222, 223 and 224. The beams 221 and 224 are connected between the posts 215, 216 and 213, 214, respectively. The beams 222 and 223 are connected to the lower sides of the beams 219 and 220.

The transformers and their connecting busses are disposed within a framework which is extended to the rear of the main framework. It comprises the additional columns 226, 227, 228 and 229, as may be seen in Fig. 6, these columns extending up only to the level of the beams 219 and 220. The tops of these shorter columns are connected to each other and to the main framework by box girder beams 230, 231, 232 and 233.

Obviously, if diagonal bracing be desired, it may be interposed along the outside portions of the rectangular frame, as, for example, between beams 217 and 219, between beams 212 and 221; between beams 210 and 224, and between beams 218 and 220.

Referring now to the frame for the transformers and their connections, a longitudinally extending platform 235 is disposed at the rear of the main rectangular frame and under the supplemental frame to support the low tension busses 236, which are extended longitudinally of the beam 218 and supported on suitable insulators on said bracket frame 235. These low tension busses are fed from a suitable source of power connected to the cable 237, the cable conductors being fanned out through the potheads 238. I have shown three main transformers 239, 240 and 241 and an auxiliary or spare transformer 242, the primary leads of which are arranged to be connected to the low tension busses 236 in delta connection. The spare transformer 242 is not normally connected, but is arranged to be connected to take the place of any one of the transformers which is to be taken out of service.

A plurality of transformer connection busses are disposed within the supplementary frame, these busses being shown at 242A, 242B and 242C, collectively indicated by reference numeral 242. A star connection bus conductor 243 is also provided for connecting together one terminal of each secondary transformer winding. The opposite terminals of the transformer winding are connected to the respective phase conductors 242. The star connection bus 243 is mounted on suspension insulators 244 and 245, connected in turn to the posts 227 and 228. By reference to Fig. 9 it will be seen that the star connection bus 243 is disposed at a lower level than the bus conductors 242. Obviously, the conductor 243 may be employed as the delta connection bus, if such connection of the transformers is desired.

The conductors 242 are mounted on suspension insulators 246 at one end and connected to the beam 231, and suspension insulators 247 connected to the beam 233 at the other end.

The station shown in Figs. 6 to 10, inclusive, shows a single outgoing line. Obviously, the size of the station or yard may be increased to any desired capacity of lines. In the lower bay, and viewed in Fig. 6, transformer busses 249A, 249B and 249C are suspended on suspension type insulators. The insulators 250 at the left of Fig. 6 are connected to the beam 219 and the suspension insulators 251 at the right of Fig. 6 are connected at the beam 220. Connection is now made between the transformer connecting busses 242 and the transformer busses 249 by leads 252A, 252B and 252C, collectively designated as 252. These leads join bus conductors 253A, 253B and 253C, collectively designated as 253, supported by insulators 254 and 255 depending from the girders 220 and 232, respectively. These conductors 253 are led down to make connection with the potential transformers 256 and through the current transformers 257, from whence conductors 258 extend up to and connect with the bus conductors 249.

The main bus conductors 260A, 260B and 260C are mounted on suspension insulators 261 connected to the beam 210 and suspension insulators 262 mounted on the beam 212.

In like manner, the auxiliary or transfer bus conductors 263A, 263B and 263C are suspended by the suspension insulators 264 connected to the beam 210 and the suspension insulators 265 connected to the beam 212.

Figure 7:
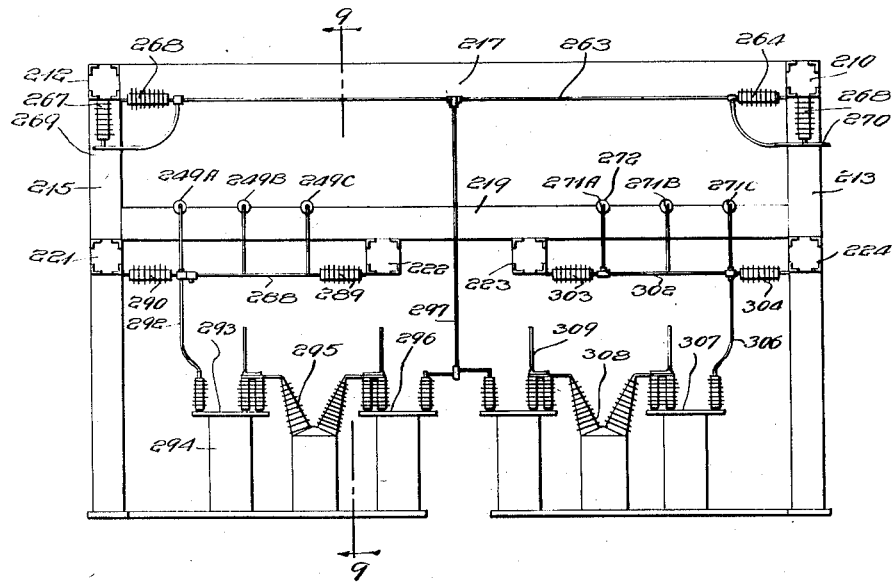
Fig. 7 is a cross section taken on the line 7—7 of Fig. 6.
Figure 8:
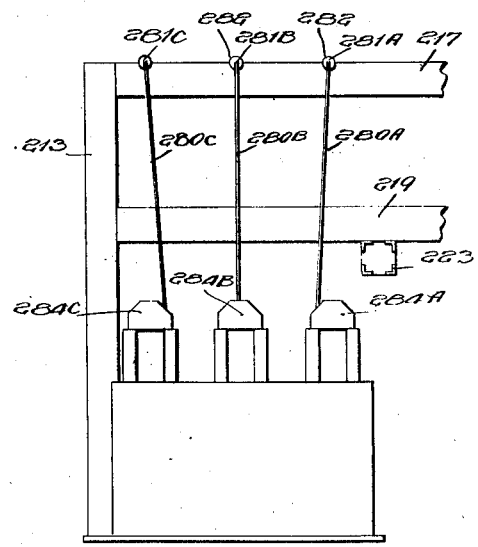
Fig. 8 is an elevational view taken on the line 8—8 of Fig. 6.

In Figs. 7 and 9, I have indicated the manner in which the busses, such as 260 and 263, may be extended to other bays placed in line above and below the bays shown in Fig. 6. By mounting depending posts insulators 267 and 268 below the frame members 212 and 210, extensions 269 and 270 of the bus 263 may be made to the next bay or pair of bays, on either side.

In the upper bay shown in Fig. 6, there is mounted the bus having the conductors 271A, 271B and 271C. These bus conductors are mounted on suspension insulators 272 connected to the beam 219 and insulators 273 connected to the beam 220. From the bus conductors for the line, leads 274 extend down through the current transformers 275, thence to the potential transformers 276, thence by conductor 277 to the disconnect switches 278, choke coils 279 and conductor 280 to the overhead line conductor 281, which are anchored to the beam 217 by the strain or suspension insulators 282. The leads 280 are also connected to disconnect switches 283 leading to the lightning arresters 284.

Connections between the transformer busses 249 and the main and auxiliary bus conductors 260 and 263, respectively, are made through disconnects and circuit breakers, as will now be described. Since the disconnect switches for 132 k. v. require a large clearance and heavy insulators, I mount these disconnects on foundations as distinguished from mounting them on the framework as previously shown in connection with lower voltage installation.

Likewise, to make connection between the transformer bus 249 and the transfer bus, I provide short horizontal bus conductors 288A, 288B and 288C collectively designated as 288, supported between the beams 221 and 222 by insulators 289 and 290. From these short bus conductors 288 a series of taps 292 extend down all in line with each other to the free terminal of the disconnect switches 293, which are supported on suitable bases 294 on the foundation. The disconnect switches 293 are connected to the oil circuit breakers 295, and the oil circuit breakers, in turn, are connected through disconnect 296 to a common central taps 297 which lead up through the auxiliary bus 263. These common taps 297 lie in the same vertical plane between the central longitudinal beams 222 and 223.

In a similar manner, the short bus 285 is connected through suitable taps, including the disconnects 301, circuit breakers 298 and disconnects 299, to a series of central taps 300, which lie directly in line with the taps 297.

In like manner in the upper bay, I provide the short horizontal bus conductors 302 mounted between the beams 223 and 224 on suspension insulators 303 and 304 for making connection between the central taps 297 and the line bus 271. A series of vertical taps 306 extend down from the short busses 302 to the free contacts of the disconnect switches 307, the opposite terminals of which switches are connected to the circuit breakers 308, and the circuit breakers 308 are in turn connected through the disconnects 309 to the central taps 297 which lead to the transfer bus 263.

In a similar manner short bus conductors 311A, 311B and 311C are mounted on suspension insulators 312 and 313, the insulators 313 being directly below the insulators 261 in Fig. 6, and through suitable taps connections are made through the disconnects 314, oil circuit breakers 315 and disconnects 316 to the central vertical conductors 300 which are connected to the main bus 260.

From the foregoing it will be seen that the transformer busses, line busses, and the main and auxiliary busses are all supported on suspension insulators which are better adapted for higher voltages. The same fundamental theory of disposing the line bus longitudinally below the main and auxiliary or transfer bus, is observed. The circuit breakers are disposed longitudinally in rows, as in the former embodiment; the disconnects, instead of being mounted on the frame, are mounted on the foundation on each side of the circuit breakers. It will be observed that the structural frame is made up of identical units for any size switch yard and, hence, the same may be stocked as in the case of the previous construction. When the circuit breakers have been operated, the disconnects may be opened and everything rendered dead in the line circuits. All apparatus and conductors are in open conveniently accessible position.

By reference to Fig. 7, it will be observed that in this embodiment the bays are still electrically individual, but, from the standpoint of the framework, they are grouped in pairs. Due to the common central taps, such as 297 shown in Fig. 7, adjacent bays are arranged as complementary left and right parts rather than a succession of individually identical parts, as shown in the prior embodiment of Fig. 11. It will be observed, however, that again each bay comprises a longitudinal row of columns with longitudinal and transverse frame elements, and that the tap between the overhead bus, such as 263 in Fig. 7, extends downwardly along one side of the longitudinal frame member, such as 222, and then is connected to the circuit breakers 295 arranged in longitudinal rows, and then extends upwardly to the longitudinal line bus conductors, such as 249. The longitudinal frame element 222 is not in line with the posts such as 215, but is disposed at the opposite side of the bay, as distinguished from the longitudinal frame elements 39—39 which are in line with the posts 17 in Fig. 4, because, in the embodiment of Fig. 7, the disconnects are supported from the ground instead of on the opposite side of the longitudinal frame elements. It will be observed that thus there are certain essential characteristics common to the two embodiments. It will be observed also that the manner of leading in the aerial line to a suspension insulator connected to the top of the frame, and then leading by a tap down to the lightning arrester, choke coil, disconnect switches, instrument transformers, and then up to the individual line bus conductors, is the same in each embodiment.

Where underground lines are connected they come in cable and terminate in potheads where aerial conductors or leads then connect to the instrument transformers and lead up within the frame to the line bus conductors.

In each embodiment above shown and described it is to be observed that the circuit breakers are disposed with their pairs of terminals aligned with the bus phase conductors to which they are connected. The oil circuit breaker terminals of each phase and the bus conductors of that phase define a common plane for that phase and the connections from the bus conductors to the oil circuit breakers and from the oil circuit breakers to the line conductors for that phase lie in approximately the aforesaid plane. The breaks of the circuit breakers, therefore, lie lengthwise of the bus conductors and transversely of the power or line conductors. This permits of shorter connections, more advantageous use of space, unit construction, extensibility, flexibility of design, greater safety and the general advantages and specific advantages above enumerated.

Obviously, I do not intend to be limited to the details shown and described, except as they are specifically included in the appended claims.

I claim:—

1. In a switch yard, the combination of a structural steel frame comprising a plurality of similar rectangular bays, each bay comprising supporting columns disposed in relatively longitudinal rows and an overhead framework connecting said columns, relatively transverse bus conductors mounted on said frame in insulated relation, relatively longitudinal line bus conductors mounted on said frame in insulated relation below said bus conductors, and circuit breakers disposed on the ground in longitudinal rows in substantial alignment with said rows of columns for connecting said transverse bus conductors and said longitudinal bus conductors.

2. In a switch yard, the combination of a structural steel frame comprising a plurality of similar bays, each bay comprising supporting columns disposed in relatively longitudinal rows and an overhead framework connecting said columns, relatively transverse bus conductors mounted on said frame in insulated relation, relatively longitudinal bus conductors mounted on said frame below said bus conductors, circuit breakers disposed below the bus conductors in longitudinal rows, a first series of taps leading down from the transverse bus conductors to the circuit breakers, and a second series of taps leading up from the circuit breakers to the longitudinal line bus conductors, and a longitudinal frame member disposed between said two series of taps and serving to support in part at least one of said series of taps.

3. In a switch yard, the combination of a structural steel frame comprising a plurality of similar bays, each bay comprising supporting columns and an overhead framework connecting said columns, relatively transverse bus conductors mounted on said frame in insulated relation, relatively longitudinal bus conductors mounted on said frame below said bus conductors, circuit breakers disposed below the said bus conductors in longitudinal rows, a first series of taps leading down from the transverse bus conductors to the circuit breakers, and a second series of taps leading up from the circuit breakers to the longitudinal line bus conductors, and a longitudinal frame member disposed between said two series of taps and serving to support in part at least one of said series of taps, and disconnect switches in said taps supported on said longitudinal frame member.

4. In a switch yard, the combination of a structural steel frame comprising a plurality of similar bays, each bay comprising supporting columns disposed in a relatively longitudinal row and overhead framework connecting said columns, relatively transverse bus conductors mounted on said frame in insulated relation and common to all of said bays, relatively longitudinal line bus conductors within each bay mounted on said frame below said bus conductors, circuit breakers disposed on the ground in a longitudinal row parallel with the row of columns for connecting said transverse bus conductors and said longitudinal bus conductors, connections from said circuit breakers to the bus conductors, said connections lying substantially in the same vertical plane as the connected transverse bus conductors, and overhead line conductors supported from the top of said steel frame and connected to said line bus conductors.

5. A switch yard comprising the combination of an overhead structural steel frame comprising longitudinal and transverse elements, a plurality of columns supporting said overhead frame, said columns being disposed in longitudinal and transverse rows, said frame defining a plurality of bays, transverse bus conductors mounted at the top of the frame across a plurality of said bays, longitudinal line bus conductors disposed in each bay below the transverse bus conductors, overhead line conductors strung from the front end of one bay at the top of the frame, taps leading from the overhead line conductors down under the forward end of the frame and up to the longitudinal line bus conductors of said one bay, lightning arresters disposed in front of said one bay and disconnects between said taps and said lightning arresters, instrument transformers disposed at the base of the front end of the frame and connected to the bottom part of said taps, circuit breakers disposed in a longitudinal row for each bay, and groups of taps connecting the circuit breakers between the longitudinal bus conductors and the transverse bus conductors.

6. A switch yard comprising the combination of an overhead structural steel frame comprising longitudinal and transverse elements, a plurality of columns supporting said overhead frame, said columns being disposed in longitudinal and transverse rows, said frame defining a plurality of bays, transverse bus conductors mounted at the top of the frame across a plurality of said bays, longitudinal bus conductors disposed in each bay below the transverse bus conductors, overhead line conductors strung from the front end of one bay at the top of the frame, taps leading from the overhead line conductors down under the forward end of the frame and up to the longitudinal bus conductors of said one bay, lightning arresters disposed in front of said one bay and disconnects between said taps and said lightning arresters, instrument transformers disposed at the base of the front end of the frame and connected to the bottom part of said taps, circuit breakers disposed in a longitudinal row for each bay, and groups of taps connecting the circuit breakers between the longitudinal bus conductors and the transverse bus conductors, said frame having a longitudinal element disposed between groups of taps and serving to support one of said groups of taps.

7. A switch yard comprising the combination of an overhead structural steel frame comprising longitudinal and transverse elements, a plurality of columns supporting said overhead frame, said columns being disposed in longitudinal and transverse rows, said frame defining a plurality of bays, transverse bus conductors mounted at the top of the frame across a plurality of said bays, longitudinal bus conductors disposed in each bay below the transverse bus conductors, overhead line conductors strung from the front end of one bay at the top of the frame, taps leading from the overhead line conductors down under the forward end of the frame and up to the longitudinal bus conductors of said one bay, lightning arresters disposed in front of said one bay and disconnects between said taps and said lightning arresters, instrument transformers disposed at the base of the front end of the frame and connected to the bottom part of said taps, circuit breakers disposed in a longitudinal row for each bay, and groups of taps connecting the circuit breakers between the longitudinal bus conductors and the transverse bus conductors, said frame comprising a longitudinal element disposed between groups of taps, and disconnects for said groups of taps connected at opposite sides of the circuit breakers and mounted on opposite sides of said longitudinal element.

8. A unit construction for switch yards, comprising an overhead frame, a row of columns supporting said frame, insulators above the frame, bus conductors supported on said insulators and extending transversely of the row of columns, insulators below the frame, line conductors supported on said latter insulators and extending longitudinally of said row of columns, circuit breakers disposed in a row longitudinally of said row of columns, and conductors extending from said bus conductors down to the circuit breakers, and from the circuit breakers up to the line conductors upon opposite sides of said row of columns.

9. A unit construction for switch yards, comprising an overhead frame, a row of columns providing support for said frame, insulators above the frame, bus conductors supported on said insulators and extending transversely of the row of columns, insulators below the frame, line conductors supported on said latter insulators and extending longitudinally of said row of columns, circuit breakers disposed in a row longitudinally of said row of columns, and conductors extending from said bus conductors down to the circuit breakers, and from the circuit breakers up to the line conductors upon opposite sides of said row of columns, frame members extending along the row of columns below the overhead frame, and disconnects mounted back to back on said frame members above said circuit breakers and connected in series therewith.

10. In a switch yard, a framework comprising an open rectangular frame, a plurality of columns supporting said frame, incoming power conductors and outgoing power conductors disposed in parallel relation to each other in substantially a common plane and supported by said frame, bus conductors transverse to said power conductors and disposed in approximately a plane above said power conductors and supported by said frame, and circuit breakers disposed substantially below the point of nearest approach of said conductors to each other for interconnecting the same said circuit breakers having each a pair of terminals and said pairs of terminals being disposed in approximately common planes with the corresponding bus conductors.

11. In a switch yard, an open rectangular frame, posts supporting said frame, incoming power conductors and outgoing power conductors disposed in substantially a common plane and supported by said frame, transverse bus conductors disposed in approximately a common plane above the plane of said power conductors and supported by said frame, and aerial line conductors supported on the outside frame at its upper edge and connected to said outgoing power conductors and circuit breakers connecting said power conductors and said bus conductors, said circuit breakers having their terminals aligned with the bus conductors.

12. In a switch yard, the combination of parallel incoming power conductors, parallel outgoing power conductors, said conductors being disposed all in a common plane, transverse parallel bus conductors disposed in a plane above the first plane, and circuit breakers arranged in rows below said power conductors and bus conductors for interconnecting the bus conductors and power conductors, said rows extending longitudinally of said power conductors, a rectangular overhead frame for supporting said power and bus conductors, posts supporting said overhead frame, said posts being disposed in longitudinal rows, a row for each group of power conductors, longitudinally extending frame elements connecting said posts in each row, and connections between said circuit breakers and said power conductors and bus conductors supported in part by said longitudinally extending frame elements.

13. In a switch yard, the combination of a plurality of columns, an overhead open rectangular frame supported on the upper ends of said columns, transverse bus conductors suspended on insulators in said open frame, a plurality of longitudinal beams below said open frame also supported by said columns, transverse beams at the ends of the longitudinal beams, a plurality of groups of longitudinal bus conductors suspended on insulators secured to said transverse beams, said groups of conductors being disposed between pairs of longitudinal beams, circuit breakers disposed in longitudinal rows between said groups of longitudinal bus conductors, disconnects for the circuit breakers disposed in rows on each side of the circuit breakers, taps from the transverse bus conductors extending down to the disconnects on one side of the circuit breakers and taps extending from the disconnects on the other side of the circuit breakers to the longitudinal bus conductors.

14. In a switch yard, a framework comprising an open frame, a plurality of columns supporting said frame, incoming power conductors and outgoing power conductors disposed in parallel relation to each other in substantially a common plane and supported by said frame, transverse bus conductors disposed in a plane above said power conductors and supported by said frame, circuit breakers disposed substantially below the points of nearest approach of said conductors for interconnecting the same, a supplementary frame at one end of the main frame, transformer busses supported in said supplementary frame transversely to said power conductors, and conductors looping from the transformer busses down under the end of the main frame and extending up to the longitudinal power conductors, said circuit breakers having pairs of terminals longitudinally in alignment with the bus conductors.

15. In a switch yard, the combination of a main bus and a transfer bus having phase conductors disposed substantially parallel to each other and in substantially the same plane, circuit conductors comprising phase conductors disposed substantially at right angles to the bus phase conductors and in a horizontal plane substantially parallel to and below the plane of the bus phase conductors, connections including circuit breakers for connecting the circuit conductors to the bus phase conductors, said circuit breakers being disposed substantially at and below the underpass of the circuit conductors with respect to the bus conductors, said connections lying approximately in vertical planes defined by the bus phase conductors.

16. In a device of the class described, a main bus, a transfer bus, said busses each having their conductors disposed horizontally in substantial parallelism, a line comprising circuit conductors disposed horizontally under the busses, circuit breakers disposed substantially under the underpass of the line with respect to the busses, said circuit breakers having pairs of terminals disposed in vertical planes substantially coincidental with vertical planes defined by the bus conductors, and connections between the said terminals and the adjacent bus conductors and circuit conductors, said connections lying approximately in substantially parallel planes transverse to the circuit conductors.

17. In combination in a device of the class described, a bus having parallel phase conductors disposed substantially in a horizontal plane, a line having parallel phase conductors transverse to the bus conductors disposed in parallelism in substantially a horizontal plane below the plane of the bus conductors, circuit breakers for connecting said line and bus conductors, said circuit breakers having terminals, said terminals and the corresponding bus conductor of a given phase lying in substantially a common plane and conductors from said terminals to the corresponding line and bus conductors of the same phase lying in approximately the same plane.

18. In combination in a device of the class described, a bus having parallel phase conductors disposed substantially in a horizontal plane, a line having parallel phase conductors transverse to the bus conductors disposed in parallelism in substantially a horizontal plane below the plane of the bus conductors, circuit breakers having terminals, and connections for joining said terminals to the bus conductors and the line conductors of each plane, said terminals and connections for each phase lying in substantially a common plane with the bus conductor of the same phase.

19. In a station of the class described, a pair of parallel busses, a transverse line below the busses, circuit breakers disposed on the ground, said circuit breakers having pairs of terminals aligned with the line conductors, connections from the terminals of one side of the circuit breakers to the busses and connections from the terminals of the other side of the circuit breakers extending up to the line conductors, both connections for a given phase lying substantially in a common plane with the corresponding bus phase conductors.

20. In a station of the class described, a steel frame comprising relatively longitudinal and relatively transverse frame members, a pair of parallel busses, a line below and relatively transverse to the busses, circuit breakers disposed on the ground said circuit breakers having pairs of terminals aligned with the line conductors, connections from the terminals of one side of the circuit breakers to the busses lying on one side of a transverse frame member and connections from the terminals of the other side of the circuit breakers extending to the line conductors on the other side of the said transverse frame member both connections for a given phase lying substantially in a common plane with the correspondingly bus phase conductor.

21. In a system of the class described, a plurality of stationary busses having parallel conductors, a plurality of stationary lines having parallel conductors transverse to and below the bus conductors, circuit breakers on the ground having terminals and connections from the terminal to the bus and line conductors said connections being disposed substantially in planes transverse to the line conductors.

22. In a switch yard, the combination of a plurality of horizontally disposed busses, a plurality of transverse circuit conductors, circuit breakers under the busses and at one side of the line said circuit breakers having one set of risers leading up to said busses and another set of risers extending laterally to the circuit conductors, said circuit conductors all lying below the busses.

23. In a station the combination of an overhead metallic frame consisting of longitudinal and transverse members connected together, posts for supporting the overhead frame, separating frame members connected between the posts and disposed under the overhead frame and defining bays, busses comprising bus conductors disposed upon the frame and extending across a plurality of bays, circuit conductors for lines disposed in the bays transversely of and below the bus conductors, circuit breakers disposed in rows under and parallel with the separating frame members, riser connections extending on one side of a separating frame member from the circuit breakers to the bus conductors and extending on the other side of said separating frame member to the line circuit conductors.

24. In a station the combination of an overhead metallic frame consisting of longitudinal and transverse members connected together, posts for supporting the overhead frame, separating frame members connected between the posts and disposed under the overhead frame and defining bays, busses comprising bus conductors disposed up on the frame and extending across a plurality of bays, circuit conductors for lines disposed in the bays transversely of the bus conductors, circuit breakers disposed in rows under the separating frame members, riser connections extending on one side of a separating frame member from the circuit breakers to the bus conductors and extending on the other side of said separating frame member to the line circuit conductors, and disconnects in said riser connections mounted on said separating frame members, the disconnects for one side of a set of circuit breakers being disposed in one bay and the disconnects for the other side of said set of circuit breakers being disposed in the adjacent bay.

25. In a switch yard, the combination of a structural framework comprising an elevated frame and supporting column, said frame comprising relatively longitudinal beams and relatively transverse connecting beams, with the supporting columns disposed in longitudinal rows under the longitudinal beams, bus conductors supported in insulated relation upon said frame and extending relatively transversely with respect to said longitudinal beams, line conductors supported in insulated relation upon said frames below the bus conductors and extending relatively longitudinally with respect to said longitudinal beams, and circuit breakers disposed below the frame, the circuit breakers having pairs of terminals disposed in substantially parallel vertical planes which coincide substantially with the vertical planes of the bus conductors, and connections from the said terminals to the line and bus conductors, said connections being disposed substantially in the corresponding aforesaid planes.

26. In a switch yard, the combination of a structural framework comprising an elevated frame and supporting column, said frame comprising relatively longitudinal beams and relatively transverse connecting beams, with the supporting columns disposed in longitudinal rows under the longitudinal beams, bus conductors supported in insulated relation upon said frame and extending relatively transversely with respect to said longitudinal beams, line conductors supported in insulated relation upon said frame below the bus conductors and extending relatively longitudinally with respect to said longitudinal beams, and circuit breakers disposed below the frame, the circuit breakers having pairs of terminals disposed in substantially parallel vertical planes which coincide substantially with the vertical planes of the bus conductors, and connections from the said terminals to the line and bus conductors, said connections being disposed substantially in the corresponding aforesaid planes, the circuit breakers being disposed in a longitudinal row coinciding substantially with one of the longitudinal rows of columns.

In witness whereof, I have hereunto subscribed my name this 27th day of December, A. D., 1927.

ALLEN M. ROSSMAN.